(12) United States Patent
Shedrinsky (10) Patent No.: US 9,002,980 B2
(45) Date of Patent: *Apr. 7, 2015

(54) ESTABLISHING A VIRTUAL TUNNEL BETWEEN TWO COMPUTER PROGRAMS

(75) Inventor: Felix Shedrinsky, Weymouth, MA (US)

(73) Assignee: Axeda Corporation, Foxboro, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/614,311

(22) Filed: Sep. 13, 2012

(65) Prior Publication Data

US 2013/0067031 A1 Mar. 14, 2013

Related U.S. Application Data

(63) Continuation of application No. 13/105,385, filed on May 11, 2011, now Pat. No. 8,291,039, which is a continuation of application No. 10/784,138, filed on Feb. 20, 2004, now Pat. No. 7,966,418.

(60) Provisional application No. 60/449,213, filed on Feb. 21, 2003.

(51) Int. Cl.
*G06F 15/16* (2006.01)
*H04L 29/06* (2006.01)

(52) U.S. Cl.
CPC .................................. *H04L 63/0281* (2013.01)

(58) Field of Classification Search
USPC .......................................... 709/203, 217–219
See application file for complete search history.

(56) References Cited

U.S. PATENT DOCUMENTS

| | | | |
|---|---|---|---|
| 4,086,434 | A | 4/1978 | Bocchi |
| 4,412,292 | A | 10/1983 | Sedam et al. |
| 4,497,037 | A | 1/1985 | Kato et al. |
| 4,583,834 | A | 4/1986 | Seko et al. |
| 4,853,946 | A | 8/1989 | Elliott et al. |
| 4,962,368 | A | 10/1990 | Dobrzanski et al. |
| 4,964,065 | A | 10/1990 | Hicks et al. |
| 4,965,946 | A | 10/1990 | Hegedus et al. |
| 4,996,703 | A | 2/1991 | Gray |

(Continued)

FOREIGN PATENT DOCUMENTS

| | | |
|---|---|---|
| EP | 0874306 | 10/1998 |
| EP | 1 191 744 | 3/2002 |

(Continued)

OTHER PUBLICATIONS

Action and Response History in U.S. Appl. No. 11/537,399.

(Continued)

*Primary Examiner* — Minh-Chau Nguyen
(74) *Attorney, Agent, or Firm* — Fish & Richardson P.C.

(57) ABSTRACT

A system transfers data via a communication session between a client application and a server application, where the client application runs on a first network and the server application runs on a second network. The system includes a proxy having a socket to the client application. The proxy converts data between a local protocol run on the first network to a non-local protocol. An agent creates a socket to the server application. The agent converts data between a local protocol run on the second network and the non-local protocol. A server is in communication with the proxy and the agent. The server contains a message queue dedicated to the communication session. The message queue stores data transmitted during the communication session.

25 Claims, 3 Drawing Sheets

(56) References Cited

U.S. PATENT DOCUMENTS

| | | |
|---|---|---|
| 5,038,319 A | 8/1991 | Carter et al. |
| 5,057,866 A | 10/1991 | Hill, Jr. et al. |
| 5,061,837 A | 10/1991 | Gilbert et al. |
| 5,077,582 A | 12/1991 | Kravette et al. |
| 5,084,875 A | 1/1992 | Weinberger et al. |
| 5,129,080 A | 7/1992 | Smith |
| 5,138,377 A | 8/1992 | Smith et al. |
| 5,163,151 A | 11/1992 | Bronikowski et al. |
| 5,184,179 A | 2/1993 | Tarr et al. |
| 5,204,699 A | 4/1993 | Birnbaum et al. |
| 5,212,645 A | 5/1993 | Wildes et al. |
| 5,214,772 A | 5/1993 | Weinberger et al. |
| 5,216,461 A | 6/1993 | Maekawa et al. |
| 5,220,380 A | 6/1993 | Hirata et al. |
| 5,224,157 A | 6/1993 | Yamada et al. |
| 5,243,382 A | 9/1993 | Takano et al. |
| 5,257,069 A | 10/1993 | Hirata et al. |
| 5,261,061 A | 11/1993 | Ju |
| 5,270,775 A | 12/1993 | Suzuki |
| 5,282,127 A | 1/1994 | Mii |
| 5,291,244 A | 3/1994 | Kajiwara et al. |
| 5,293,196 A | 3/1994 | Kaneko et al. |
| 5,297,034 A | 3/1994 | Weinstein |
| 5,297,256 A | 3/1994 | Wolstenholme et al. |
| 5,300,980 A | 4/1994 | Maekawa et al. |
| 5,303,005 A | 4/1994 | Takano et al. |
| 5,305,055 A | 4/1994 | Ebner et al. |
| 5,305,199 A | 4/1994 | LoBiondo et al. |
| 5,307,263 A | 4/1994 | Brown |
| 5,325,156 A | 6/1994 | Ulinski |
| 5,333,286 A | 7/1994 | Weinberger et al. |
| 5,335,048 A | 8/1994 | Takano et al. |
| 5,339,168 A | 8/1994 | Evanitsky et al. |
| 5,342,037 A | 8/1994 | Martin |
| 5,347,346 A | 9/1994 | Shimizu et al. |
| 5,359,391 A | 10/1994 | Kuroyanagi et al. |
| 5,361,265 A | 11/1994 | Weinberger et al. |
| 5,365,310 A | 11/1994 | Jenkins et al. |
| 5,367,667 A | 11/1994 | Wahlquist et al. |
| 5,369,469 A | 11/1994 | Leo et al. |
| 5,369,471 A | 11/1994 | Yamada |
| 5,369,472 A | 11/1994 | Raj et al. |
| 5,373,349 A | 12/1994 | Ito |
| 5,384,622 A | 1/1995 | Hirata et al. |
| 5,386,271 A | 1/1995 | Maekawa et al. |
| 5,392,095 A | 2/1995 | Siegel |
| 5,398,257 A | 3/1995 | Groenteman |
| 5,404,199 A | 4/1995 | Hirata et al. |
| 5,412,779 A | 5/1995 | Motoyama |
| 5,414,494 A | 5/1995 | Aikens et al. |
| 5,420,667 A | 5/1995 | Kaneko et al. |
| 5,424,808 A | 6/1995 | Maekawa et al. |
| 5,424,844 A | 6/1995 | Koyanagi et al. |
| 5,428,551 A | 6/1995 | Trainor et al. |
| 5,430,709 A | 7/1995 | Galloway |
| 5,434,650 A | 7/1995 | Nakahara et al. |
| 5,442,541 A | 8/1995 | Hube et al. |
| 5,444,517 A | 8/1995 | Nagashima |
| 5,444,851 A | 8/1995 | Woest |
| 5,446,522 A | 8/1995 | Tahara et al. |
| 5,452,057 A | 9/1995 | Imaizumi et al. |
| 5,459,552 A | 10/1995 | Ohira |
| 5,463,775 A | 10/1995 | DeWitt et al. |
| 5,469,353 A | 11/1995 | Pinsky et al. |
| 5,485,142 A | 1/1996 | Stute et al. |
| 5,488,454 A | 1/1996 | Fukada et al. |
| 5,491,535 A | 2/1996 | Hirata et al. |
| 5,493,364 A | 2/1996 | Kuroyanagi et al. |
| 5,517,491 A | 5/1996 | Nanni et al. |
| 5,528,691 A | 6/1996 | Rosauer et al. |
| 5,530,899 A | 6/1996 | MacDonald |
| 5,543,892 A | 8/1996 | Hirata et al. |
| 5,548,376 A | 8/1996 | Kikuno |
| 5,550,957 A | 8/1996 | Davidson, Jr. et al. |
| 5,555,191 A | 9/1996 | Hripcsak |
| 5,561,501 A | 10/1996 | Honma |
| 5,572,672 A | 11/1996 | Dewitt et al. |
| 5,579,087 A | 11/1996 | Salgado |
| 5,586,254 A | 12/1996 | Kondo et al. |
| 5,594,529 A | 1/1997 | Yamashita et al. |
| 5,600,301 A | 2/1997 | Robinson, III |
| 5,600,403 A | 2/1997 | Inoo |
| 5,603,060 A | 2/1997 | Weinberger et al. |
| 5,603,323 A | 2/1997 | Pflugrath et al. |
| 5,619,024 A | 4/1997 | Kolls |
| 5,619,716 A | 4/1997 | Nonaka et al. |
| 5,631,724 A | 5/1997 | Sawada et al. |
| 5,636,008 A | 6/1997 | LoBiondo et al. |
| 5,636,333 A | 6/1997 | Davidson, Jr. et al. |
| 5,638,427 A | 6/1997 | Flemming et al. |
| 5,640,495 A | 6/1997 | Colbert et al. |
| 5,642,202 A | 6/1997 | Williams et al. |
| 5,642,208 A | 6/1997 | Takahashi et al. |
| 5,655,084 A | 8/1997 | Pinsky et al. |
| 5,659,794 A | 8/1997 | Caldarale et al. |
| 5,673,190 A | 9/1997 | Kahleck et al. |
| 5,675,744 A | 10/1997 | Tsujii |
| 5,677,775 A | 10/1997 | Yamaguchi et al. |
| 5,694,528 A | 12/1997 | Hube |
| 5,696,903 A | 12/1997 | Mahany |
| 5,699,494 A | 12/1997 | Colbert et al. |
| 5,699,523 A | 12/1997 | Li et al. |
| 5,708,908 A | 1/1998 | Hirata et al. |
| 5,708,909 A | 1/1998 | Yamashita et al. |
| 5,715,393 A | 2/1998 | Naugle |
| 5,715,496 A | 2/1998 | Sawada et al. |
| 5,715,823 A | 2/1998 | Wood et al. |
| 5,720,015 A | 2/1998 | Martin et al. |
| 5,727,135 A | 3/1998 | Webb et al. |
| 5,727,248 A | 3/1998 | Ogura |
| 5,732,212 A | 3/1998 | Perholz et al. |
| 5,736,965 A | 4/1998 | Mosebrook et al. |
| 5,740,801 A | 4/1998 | Branson |
| 5,745,268 A | 4/1998 | Eastvold et al. |
| 5,748,892 A | 5/1998 | Richardson |
| 5,748,907 A | 5/1998 | Crane |
| 5,752,125 A | 5/1998 | Yamashita et al. |
| 5,752,128 A | 5/1998 | Yamashita |
| 5,752,917 A | 5/1998 | Fuchs |
| 5,761,529 A | 6/1998 | Raji et al. |
| 5,764,918 A | 6/1998 | Poulter |
| 5,768,516 A | 6/1998 | Sugishima |
| 5,772,585 A | 6/1998 | Lavin et al. |
| 5,774,052 A | 6/1998 | Hamm et al. |
| 5,786,994 A | 7/1998 | Friz et al. |
| 5,787,149 A | 7/1998 | Yousefi et al. |
| 5,787,278 A | 7/1998 | Barton et al. |
| 5,790,793 A | 8/1998 | Higley |
| 5,790,977 A | 8/1998 | Exekiel |
| 5,798,738 A | 8/1998 | Yamada |
| 5,801,964 A | 9/1998 | McCarthy |
| 5,809,237 A | 9/1998 | Watts et al. |
| 5,812,397 A | 9/1998 | Pech et al. |
| 5,812,874 A | 9/1998 | Yamashita et al. |
| 5,818,603 A | 10/1998 | Motoyama |
| 5,819,015 A | 10/1998 | Martin et al. |
| 5,819,110 A | 10/1998 | Motoyama |
| 5,822,221 A | 10/1998 | Groenteman |
| 5,826,027 A | 10/1998 | Pedersen et al. |
| 5,828,943 A | 10/1998 | Brown |
| 5,835,724 A | 11/1998 | Smith |
| 5,835,816 A | 11/1998 | Sawada et al. |
| 5,835,911 A | 11/1998 | Nakagawa et al. |
| 5,844,550 A | 12/1998 | Trainor et al. |
| 5,845,061 A | 12/1998 | Miyamoto et al. |
| 5,845,230 A | 12/1998 | Lamberson |
| 5,857,207 A | 1/1999 | Lo et al. |
| 5,857,967 A | 1/1999 | Frid et al. |
| 5,862,348 A | 1/1999 | Pedersen |
| 5,862,404 A | 1/1999 | Onaga |
| 5,865,745 A | 2/1999 | Schmitt et al. |
| 5,872,635 A | 2/1999 | Akiyama |
| 5,872,928 A | 2/1999 | Lewis et al. |
| 5,873,009 A | 2/1999 | Yamashita et al. |

(56) References Cited

U.S. PATENT DOCUMENTS

| | | | |
|---|---|---|---|
| 5,873,659 A | 2/1999 | Edwards et al. |
| 5,878,746 A | 3/1999 | Lemelson et al. |
| 5,880,677 A | 3/1999 | Lestician |
| 5,884,072 A | 3/1999 | Rasmussen |
| 5,887,216 A | 3/1999 | Motoyama |
| 5,890,029 A | 3/1999 | Hirata et al. |
| 5,894,416 A | 4/1999 | Kuroyanagi et al. |
| 5,897,235 A | 4/1999 | Honma |
| 5,901,286 A | 5/1999 | Danknick et al. |
| 5,905,906 A | 5/1999 | Goffinet et al. |
| 5,909,493 A | 6/1999 | Motoyama et al. |
| 5,911,095 A | 6/1999 | Atsumi et al. |
| 5,913,060 A | 6/1999 | Discavage |
| 5,917,405 A | 6/1999 | Joao |
| 5,923,842 A | 7/1999 | Pedersen et al. |
| 5,933,675 A | 8/1999 | Sawada et al. |
| 5,935,060 A | 8/1999 | Iliff |
| 5,941,949 A | 8/1999 | Pedersen |
| 5,956,487 A | 9/1999 | Venkatraman et al. |
| 5,956,698 A | 9/1999 | Lacheze et al. |
| 5,961,586 A | 10/1999 | Pedersen |
| 5,968,116 A | 10/1999 | Day et al. |
| 5,970,149 A | 10/1999 | Johnson |
| 5,974,234 A | 10/1999 | Levine et al. |
| 5,975,737 A | 11/1999 | Crater et al. |
| 5,991,810 A | 11/1999 | Shapiro et al. |
| 6,003,061 A | 12/1999 | Jones et al. |
| 6,003,070 A | 12/1999 | Frantz |
| 6,003,078 A | 12/1999 | Kodimer et al. |
| 6,006,045 A | 12/1999 | Miyawaki |
| 6,009,274 A | 12/1999 | Fletcher et al. |
| 6,009,284 A | 12/1999 | Weinberger et al. |
| 6,012,088 A | 1/2000 | Li et al. |
| 6,014,631 A | 1/2000 | Teagarden et al. |
| 6,014,691 A | 1/2000 | Brewer et al. |
| 6,014,694 A | 1/2000 | Aharoni et al. |
| 6,016,535 A | 1/2000 | Krantz et al. |
| 6,021,284 A | 2/2000 | Serizawa et al. |
| 6,022,315 A | 2/2000 | Iliff |
| 6,023,223 A | 2/2000 | Baxter, Jr. |
| 6,023,507 A | 2/2000 | Wookey |
| 6,023,721 A | 2/2000 | Cummings |
| 6,023,722 A | 2/2000 | Colyer |
| 6,023,749 A | 2/2000 | Richardson |
| 6,025,925 A | 2/2000 | Davidson, Jr. et al. |
| 6,031,964 A | 2/2000 | Anderson |
| 6,041,041 A | 3/2000 | Ramanathan et al. |
| 6,042,111 A | 3/2000 | Rivers et al. |
| 6,057,857 A | 5/2000 | Bloomfield |
| 6,060,994 A | 5/2000 | Chen |
| 6,061,603 A | 5/2000 | Papadopoulos et al. |
| 6,064,915 A | 5/2000 | Kaneko et al. |
| 6,065,118 A | 5/2000 | Bull et al. |
| 6,081,623 A | 6/2000 | Bloomfield et al. |
| 6,088,718 A | 7/2000 | Altschuler et al. |
| 6,091,915 A | 7/2000 | Takagishi |
| 6,098,116 A | 8/2000 | Nixon et al. |
| 6,101,407 A | 8/2000 | Groezinger |
| 6,108,492 A | 8/2000 | Miyachi |
| 6,112,035 A | 8/2000 | Kuroyanagi et al. |
| 6,112,256 A | 8/2000 | Goffinet et al. |
| 6,115,489 A | 9/2000 | Gupta et al. |
| 6,118,899 A | 9/2000 | Bloomfield et al. |
| 6,119,934 A | 9/2000 | Kolls |
| 6,122,463 A | 9/2000 | Nagatani |
| 6,125,363 A | 9/2000 | Buzzeo et al. |
| 6,130,999 A | 10/2000 | Serizawa et al. |
| 6,139,177 A | 10/2000 | Venkatraman et al. |
| 6,141,737 A | 10/2000 | Krantz et al. |
| 6,152,365 A | 11/2000 | Kolls |
| 6,157,944 A | 12/2000 | Pedersen |
| 6,161,145 A | 12/2000 | Bainbridge |
| 6,167,432 A | 12/2000 | Jiang |
| 6,167,448 A | 12/2000 | Hemphill et al. |
| 6,172,683 B1 | 1/2001 | Bloomfield |
| 6,175,866 B1 | 1/2001 | Holloway et al. |
| 6,181,331 B1 | 1/2001 | Trainor et al. |
| 6,189,113 B1 | 2/2001 | Rabb et al. |
| 6,196,735 B1 | 3/2001 | Inamine |
| 6,205,466 B1 | 3/2001 | Karp et al. |
| 6,209,048 B1 | 3/2001 | Wolff |
| 6,221,011 B1 | 4/2001 | Bardy |
| 6,226,650 B1 | 5/2001 | Mahajan et al. |
| 6,230,199 B1 | 5/2001 | Revashetti et al. |
| 6,246,485 B1 | 6/2001 | Brown et al. |
| 6,256,378 B1 | 7/2001 | Iggulden et al. |
| 6,256,668 B1 | 7/2001 | Slivka et al. |
| 6,260,148 B1 | 7/2001 | Aggarwal et al. |
| 6,260,248 B1 | 7/2001 | Cramer et al. |
| 6,282,454 B1 | 8/2001 | Papadopoulos et al. |
| 6,282,711 B1 | 8/2001 | Halpern et al. |
| 6,286,038 B1 | 9/2001 | Reichmeyer et al. |
| 6,286,059 B1 | 9/2001 | Sugiura |
| 6,289,461 B1 | 9/2001 | Dixon |
| 6,292,828 B1 | 9/2001 | Williams |
| 6,295,527 B1 | 9/2001 | McCormack et al. |
| 6,298,457 B1 | 10/2001 | Rachlin et al. |
| 6,304,895 B1 | 10/2001 | Schneider et al. |
| 6,307,570 B1 | 10/2001 | Stergiades |
| 6,308,099 B1 | 10/2001 | Fox et al. |
| 6,311,024 B1 | 10/2001 | Serizawa et al. |
| 6,312,378 B1 | 11/2001 | Bardy |
| 6,317,570 B1 | 11/2001 | Uchida et al. |
| 6,317,783 B1 | 11/2001 | Freishtat et al. |
| 6,317,848 B1 | 11/2001 | Sorens et al. |
| 6,324,576 B1 | 11/2001 | Newcombe et al. |
| 6,325,540 B1 | 12/2001 | Lounsberry et al. |
| 6,327,594 B1 | 12/2001 | Van Huben et al. |
| 6,336,135 B1 * | 1/2002 | Niblett et al. ............... 709/215 |
| 6,338,086 B1 | 1/2002 | Curtis et al. |
| 6,343,320 B1 | 1/2002 | Fairchild et al. |
| 6,356,933 B2 | 3/2002 | Mitchell et al. |
| 6,356,949 B1 | 3/2002 | Katsandres et al. |
| 6,366,741 B1 | 4/2002 | Fukushima |
| 6,368,284 B1 | 4/2002 | Bardy |
| 6,370,436 B1 | 4/2002 | Howard et al. |
| 6,370,552 B1 | 4/2002 | Bloomfield |
| 6,370,570 B1 | 4/2002 | Muir et al. |
| 6,370,582 B1 | 4/2002 | Lim et al. |
| 6,377,162 B1 | 4/2002 | Delestienne et al. |
| 6,377,971 B1 | 4/2002 | Madden et al. |
| 6,381,557 B1 | 4/2002 | Babula et al. |
| 6,381,712 B1 | 4/2002 | Nemitz |
| 6,397,212 B1 | 5/2002 | Biffar |
| 6,401,116 B1 | 6/2002 | Okigami |
| 6,405,310 B1 | 6/2002 | Simpson |
| 6,406,426 B1 | 6/2002 | Reuss et al. |
| 6,412,026 B1 | 6/2002 | Graf |
| 6,415,023 B2 | 7/2002 | Iggulden |
| 6,415,392 B1 | 7/2002 | Suzuki et al. |
| 6,421,671 B1 | 7/2002 | Bryan et al. |
| 6,426,798 B1 | 7/2002 | Yeung |
| 6,430,612 B1 | 8/2002 | Iizuka |
| 6,430,711 B1 | 8/2002 | Sekizawa |
| 6,434,572 B2 | 8/2002 | Derzay et al. |
| 6,437,692 B1 | 8/2002 | Petite et al. |
| 6,437,803 B1 | 8/2002 | Panasyuk et al. |
| 6,438,598 B1 | 8/2002 | Pedersen |
| 6,446,192 B1 | 9/2002 | Narasimhan et al. |
| 6,449,633 B1 | 9/2002 | Van et al. |
| 6,449,663 B1 | 9/2002 | Carney et al. |
| 6,453,127 B2 | 9/2002 | Wood et al. |
| 6,453,129 B1 | 9/2002 | Simpson et al. |
| 6,457,038 B1 | 9/2002 | Defosse |
| 6,462,831 B1 | 10/2002 | Akiyama |
| 6,466,971 B1 | 10/2002 | Humpleman et al. |
| 6,467,084 B1 | 10/2002 | Howard et al. |
| 6,471,521 B1 | 10/2002 | Dornbush et al. |
| 6,477,117 B1 | 11/2002 | Narayanaswami et al. |
| 6,479,792 B1 | 11/2002 | Beiermann et al. |
| 6,487,513 B1 | 11/2002 | Eastvold et al. |
| 6,493,517 B1 | 12/2002 | Hanson |
| 6,493,871 B1 | 12/2002 | McGuire et al. |
| 6,494,831 B1 | 12/2002 | Koritzinsky |

(56) References Cited

U.S. PATENT DOCUMENTS

| | | |
|---|---|---|
| 6,510,350 B1 | 1/2003 | Steen et al. |
| 6,523,013 B2 | 2/2003 | Shah et al. |
| 6,523,063 B1 | 2/2003 | Miller et al. |
| 6,523,130 B1 | 2/2003 | Hickman et al. |
| 6,529,848 B2 | 3/2003 | Sone |
| 6,538,667 B1 | 3/2003 | Duursma et al. |
| 6,549,612 B2 | 4/2003 | Gifford et al. |
| 6,553,336 B1 | 4/2003 | Johnson et al. |
| 6,553,490 B1 | 4/2003 | Kottapurath et al. |
| 6,559,965 B1 | 5/2003 | Simpson et al. |
| 6,560,611 B1 | 5/2003 | Nine et al. |
| 6,560,641 B1 | 5/2003 | Powderly et al. |
| 6,560,656 B1 | 5/2003 | O'Sullivan et al. |
| 6,564,227 B2 | 5/2003 | Sakakibara et al. |
| 6,567,813 B1 | 5/2003 | Zhu et al. |
| 6,574,729 B1 | 6/2003 | Fink et al. |
| 6,581,092 B1 | 6/2003 | Motoyama et al. |
| 6,581,094 B1 | 6/2003 | Gao |
| 6,587,812 B1 | 7/2003 | Takayama |
| 6,591,272 B1 | 7/2003 | Williams |
| 6,598,011 B1 | 7/2003 | Howards Koritzinsky et al. |
| 6,598,083 B1 | 7/2003 | Remer et al. |
| 6,601,087 B1 | 7/2003 | Zhu et al. |
| 6,601,159 B1 | 7/2003 | Smith et al. |
| 6,604,212 B2 | 8/2003 | Sekizawa et al. |
| 6,609,108 B1 | 8/2003 | Pulliam et al. |
| 6,611,863 B1 | 8/2003 | Banginwar |
| 6,631,407 B1 | 10/2003 | Mukaiyama et al. |
| 6,636,899 B1 | 10/2003 | Rabb et al. |
| 6,643,650 B1 | 11/2003 | Slaughter et al. |
| 6,643,690 B2 | 11/2003 | Duursma et al. |
| 6,646,655 B1 | 11/2003 | Brandt et al. |
| 6,651,110 B1 | 11/2003 | Caspers et al. |
| 6,651,190 B1 | 11/2003 | Worley et al. |
| 6,654,032 B1 | 11/2003 | Zhu et al. |
| 6,654,720 B1 | 11/2003 | Graham et al. |
| 6,654,726 B1 | 11/2003 | Hanzek |
| 6,665,425 B1 | 12/2003 | Sampath et al. |
| 6,670,810 B2 | 12/2003 | Duncan et al. |
| 6,671,695 B2 | 12/2003 | McFadden |
| 6,681,344 B1 | 1/2004 | Andrew |
| 6,681,349 B2 | 1/2004 | Sekizawa |
| 6,684,259 B1 | 1/2004 | Discavage et al. |
| 6,686,838 B1 | 2/2004 | Rezvani et al. |
| 6,687,848 B1 | 2/2004 | Najmi |
| 6,687,873 B1 | 2/2004 | Ballantyne et al. |
| 6,691,106 B1 | 2/2004 | Sathyanarayan |
| 6,691,154 B1 | 2/2004 | Zhu et al. |
| 6,691,157 B2 | 2/2004 | Muir et al. |
| 6,704,807 B1 | 3/2004 | Mathur et al. |
| 6,710,893 B1 | 3/2004 | Hou et al. |
| 6,711,593 B1 | 3/2004 | Gordon et al. |
| 6,711,618 B1 | 3/2004 | Danner et al. |
| 6,717,513 B1 | 4/2004 | Sandelman et al. |
| 6,725,281 B1 | 4/2004 | Zintel et al. |
| 6,738,798 B1 | 5/2004 | Ploetz et al. |
| 6,754,664 B1 | 6/2004 | Bush |
| 6,757,714 B1 | 6/2004 | Hansen |
| 6,757,899 B2 | 6/2004 | Zhdankin et al. |
| 6,763,274 B1 | 7/2004 | Gilbert |
| 6,763,501 B1 | 7/2004 | Zhu et al. |
| 6,766,333 B1 | 7/2004 | Wu et al. |
| 6,775,238 B1 | 8/2004 | Suzuki et al. |
| 6,779,004 B1 | 8/2004 | Zintel |
| 6,782,542 B1 | 8/2004 | Mein et al. |
| 6,785,015 B1 | 8/2004 | Smith et al. |
| 6,785,713 B1 | 8/2004 | Freeman et al. |
| 6,785,726 B1 | 8/2004 | Freeman et al. |
| 6,789,112 B1 | 9/2004 | Freeman et al. |
| 6,789,119 B1 | 9/2004 | Zhu et al. |
| 6,792,337 B2 | 9/2004 | Blackett et al. |
| 6,799,209 B1 | 9/2004 | Hayton |
| 6,799,270 B1 | 9/2004 | Bull et al. |
| RE38,609 E | 10/2004 | Chen et al. |
| 6,804,712 B1 | 10/2004 | Kracht |
| 6,807,580 B2 | 10/2004 | Freeman et al. |
| 6,810,488 B2 | 10/2004 | Teng |
| 6,816,616 B2 | 11/2004 | Teng |
| 6,823,397 B2 | 11/2004 | Rawson, III |
| 6,826,606 B2 | 11/2004 | Freeman et al. |
| 6,831,555 B1 | 12/2004 | Miller et al. |
| 6,832,239 B1 | 12/2004 | Kraft et al. |
| 6,832,373 B2 | 12/2004 | O'Neill |
| 6,834,298 B1 | 12/2004 | Singer et al. |
| 6,842,903 B1 | 1/2005 | Weschler |
| 6,857,013 B2 | 2/2005 | Ramberg et al. |
| 6,886,046 B2 | 4/2005 | Stutz et al. |
| 6,891,830 B2 | 5/2005 | Curtis |
| 6,901,448 B2 | 5/2005 | Zhu et al. |
| 6,904,593 B1 | 6/2005 | Fong et al. |
| 6,920,480 B2 | 7/2005 | Mitchell et al. |
| 6,922,724 B1 | 7/2005 | Freeman et al. |
| 6,925,335 B2 | 8/2005 | May et al. |
| 6,925,645 B2 | 8/2005 | Zhu et al. |
| 6,928,469 B1 | 8/2005 | Duursma et al. |
| 6,940,405 B2 | 9/2005 | Script et al. |
| 6,950,991 B2 | 9/2005 | Bloomfield et al. |
| 6,952,714 B2 | 10/2005 | Peart |
| 6,963,899 B1 | 11/2005 | Fernandez et al. |
| 6,972,676 B1 | 12/2005 | Kimmel et al. |
| 6,983,020 B2 | 1/2006 | Christiansen |
| 6,985,779 B2 | 1/2006 | Hsiung et al. |
| 6,986,040 B1 | 1/2006 | Kramer et al. |
| 6,990,395 B2 | 1/2006 | Ransom et al. |
| 7,003,574 B1 | 2/2006 | Bahl |
| 7,016,966 B1 | 3/2006 | Saulpaugh et al. |
| 7,020,706 B2 | 3/2006 | Cates et al. |
| 7,020,773 B1 | 3/2006 | Otway et al. |
| 7,028,025 B2 | 4/2006 | Collins |
| 7,028,081 B2 | 4/2006 | Kawashima |
| 7,028,312 B1 | 4/2006 | Merrick et al. |
| 7,031,342 B2 | 4/2006 | Teng |
| 7,032,005 B2 | 4/2006 | Mathon et al. |
| 7,043,677 B1 | 5/2006 | Li |
| 7,046,134 B2 | 5/2006 | Hansen |
| 7,051,084 B1 | 5/2006 | Hayton et al. |
| 7,057,724 B1 | 6/2006 | Mead et al. |
| 7,065,576 B2 | 6/2006 | Kamel et al. |
| 7,069,298 B2 | 6/2006 | Zhu et al. |
| 7,072,946 B2 | 7/2006 | Shafer |
| 7,079,010 B2 | 7/2006 | Champlin |
| 7,080,267 B2 | 7/2006 | Gary et al. |
| 7,082,426 B2 | 7/2006 | Musgrove et al. |
| 7,082,460 B2 | 7/2006 | Hansen et al. |
| 7,085,814 B1 | 8/2006 | Gandhi et al. |
| 7,085,824 B2 | 8/2006 | Forth et al. |
| 7,089,567 B2 | 8/2006 | Girardot et al. |
| 7,091,846 B2 | 8/2006 | Wu |
| 7,092,370 B2 | 8/2006 | Jiang et al. |
| 7,099,110 B2 | 8/2006 | Detzler |
| 7,100,200 B2 | 8/2006 | Pope et al. |
| 7,103,357 B2 | 9/2006 | Kirani et al. |
| 7,103,799 B2 | 9/2006 | Dixon |
| 7,113,988 B2 | 9/2006 | Chirashnya et al. |
| 7,116,681 B1 * | 10/2006 | Hovell et al. ............... 370/466 |
| 7,117,239 B1 | 10/2006 | Hansen |
| 7,117,243 B2 | 10/2006 | Peart |
| 7,127,525 B2 | 10/2006 | Coleman et al. |
| 7,130,883 B2 | 10/2006 | Zhu et al. |
| 7,142,839 B2 | 11/2006 | Pelaez et al. |
| 7,149,792 B1 | 12/2006 | Hansen |
| 7,158,483 B1 | 1/2007 | Takabatake et al. |
| 7,162,315 B2 | 1/2007 | Gilbert |
| 7,162,628 B2 | 1/2007 | Gentil et al. |
| 7,178,149 B2 | 2/2007 | Hansen |
| 7,185,014 B1 | 2/2007 | Hansen |
| 7,194,743 B2 | 3/2007 | Hayton et al. |
| 7,200,578 B2 | 4/2007 | Paltenghe et al. |
| 7,203,755 B2 | 4/2007 | Zhu et al. |
| 7,213,051 B2 | 5/2007 | Zhu et al. |
| 7,216,172 B2 | 5/2007 | Yang et al. |
| 7,234,943 B1 | 6/2007 | Aleali |
| 7,254,601 B2 | 8/2007 | Baller et al. |
| 7,266,526 B1 | 9/2007 | Drummond et al. |

(56) References Cited

U.S. PATENT DOCUMENTS

| | | |
|---|---|---|
| 7,290,061 B2 | 10/2007 | Lentini et al. |
| 7,293,176 B2 | 11/2007 | Otway et al. |
| 7,330,872 B2 | 2/2008 | Peart et al. |
| 7,334,119 B2 | 2/2008 | Gentil et al. |
| 7,340,772 B2 | 3/2008 | Panasyuk et al. |
| 7,346,842 B1 | 3/2008 | Hayton et al. |
| 7,353,253 B1 | 4/2008 | Zhao |
| 7,359,953 B2 | 4/2008 | Muir et al. |
| 7,376,695 B2 | 5/2008 | Duursma et al. |
| 7,421,484 B2 | 9/2008 | Das |
| 7,444,071 B2 | 10/2008 | Chen |
| 7,453,379 B2 | 11/2008 | Plamondon |
| 7,460,038 B2 | 12/2008 | Samuels et al. |
| 7,490,166 B2 | 2/2009 | Yang et al. |
| 7,496,097 B2 | 2/2009 | Rao et al. |
| 7,502,726 B2 | 3/2009 | Panasyuk et al. |
| 7,502,784 B2 | 3/2009 | Collins |
| 7,506,048 B1 | 3/2009 | Motoyama |
| 7,529,767 B2 | 5/2009 | DeAnna et al. |
| 7,532,134 B2 | 5/2009 | Samuels et al. |
| 7,542,471 B2 | 6/2009 | Samuels et al. |
| 7,555,529 B2 | 6/2009 | Bloomfield et al. |
| 7,562,121 B2 | 7/2009 | Berisford et al. |
| 7,562,146 B2 | 7/2009 | Panasyuk et al. |
| 7,562,226 B2 | 7/2009 | Aiken et al. |
| 7,565,526 B1 | 7/2009 | Shaw et al. |
| 7,581,005 B2 | 8/2009 | Montemayor et al. |
| 7,584,294 B2 | 9/2009 | Plamondon |
| 7,587,755 B2 | 9/2009 | Kramer |
| 7,593,514 B1 | 9/2009 | Zhuang et al. |
| 7,594,018 B2 | 9/2009 | Pedersen |
| 7,596,593 B2 | 9/2009 | Mitchell et al. |
| 7,606,902 B2 | 10/2009 | Rao et al. |
| 7,609,721 B2 | 10/2009 | Rao et al. |
| 7,613,131 B2 | 11/2009 | Decasper et al. |
| 7,617,531 B1 | 11/2009 | Chauhan et al. |
| 7,619,545 B2 | 11/2009 | Samuels et al. |
| 7,656,799 B2 | 2/2010 | Samuels et al. |
| 7,657,657 B2 | 2/2010 | Rao et al. |
| 7,661,129 B2 | 2/2010 | Panasyuk et al. |
| 7,661,131 B1 | 2/2010 | Shaw et al. |
| 7,664,857 B2 | 2/2010 | Ovsiannikov et al. |
| 7,676,813 B2 | 3/2010 | Bisset et al. |
| 7,937,370 B2 | 5/2011 | Hansen |
| 7,966,418 B2 | 6/2011 | Shedrinsky |
| 8,055,758 B2 | 11/2011 | Hansen |
| 8,060,886 B2 | 11/2011 | Hansen |
| 8,108,543 B2 | 1/2012 | Hansen |
| 8,291,039 B2 | 10/2012 | Shedrinsky |
| 8,762,497 B2 | 6/2014 | Hansen |
| 2001/0007117 A1 | 7/2001 | Cooper et al. |
| 2001/0011250 A1 | 8/2001 | Paltenghe et al. |
| 2001/0025377 A1 | 9/2001 | Hinderks |
| 2001/0027439 A1 | 10/2001 | Holtzman et al. |
| 2001/0049690 A1 | 12/2001 | McConnell et al. |
| 2001/0049717 A1 | 12/2001 | Freeman et al. |
| 2001/0052999 A1 | 12/2001 | Hiraoka et al. |
| 2001/0056547 A1 | 12/2001 | Dixon |
| 2002/0006790 A1 | 1/2002 | Blumenstock et al. |
| 2002/0019844 A1 | 2/2002 | Kurowski et al. |
| 2002/0026514 A1 | 2/2002 | Ellis et al. |
| 2002/0032470 A1 | 3/2002 | Linberg |
| 2002/0032720 A1 | 3/2002 | Nelson et al. |
| 2002/0035533 A1 | 3/2002 | Mache et al. |
| 2002/0038320 A1 | 3/2002 | Brook |
| 2002/0052932 A1 | 5/2002 | Curtis et al. |
| 2002/0054169 A1 | 5/2002 | Richardson |
| 2002/0059489 A1 | 5/2002 | Davis et al. |
| 2002/0064138 A1 | 5/2002 | Saito et al. |
| 2002/0078135 A1 | 6/2002 | Venkatsubra |
| 2002/0078259 A1 | 6/2002 | Wendorf et al. |
| 2002/0080391 A1 | 6/2002 | Sugiura et al. |
| 2002/0095600 A1 | 7/2002 | Deen et al. |
| 2002/0116550 A1 | 8/2002 | Hansen |
| 2002/0133753 A1 | 9/2002 | Mayberry et al. |
| 2002/0135801 A1 | 9/2002 | Tessman |
| 2002/0138567 A1 | 9/2002 | Ogawa |
| 2002/0144016 A1 | 10/2002 | Spicer et al. |
| 2002/0157090 A1 | 10/2002 | Anton, Jr. |
| 2002/0174085 A1 | 11/2002 | Nelson et al. |
| 2002/0178241 A1 | 11/2002 | Eriksson |
| 2002/0191612 A1 | 12/2002 | Curtis |
| 2003/0014733 A1 | 1/2003 | Ringseth et al. |
| 2003/0023957 A1 | 1/2003 | Bau et al. |
| 2003/0025931 A1 | 2/2003 | Dorfman et al. |
| 2003/0037148 A1 | 2/2003 | Pedersen |
| 2003/0056140 A1 | 3/2003 | Taylor et al. |
| 2003/0061403 A1 | 3/2003 | Miyata et al. |
| 2003/0063119 A1 | 4/2003 | Bloomfield et al. |
| 2003/0063309 A1 | 4/2003 | Parry |
| 2003/0070006 A1 | 4/2003 | Nadler et al. |
| 2003/0072027 A1 | 4/2003 | Haines et al. |
| 2003/0081617 A1 | 5/2003 | Deng |
| 2003/0088697 A1 | 5/2003 | Matsuhira |
| 2003/0118353 A1 | 6/2003 | Baller |
| 2003/0154284 A1 | 8/2003 | Bernardin et al. |
| 2003/0158897 A1 | 8/2003 | Ben-Natan et al. |
| 2003/0158919 A1 | 8/2003 | Fomenko |
| 2003/0163569 A1 | 8/2003 | Panasyuk et al. |
| 2003/0167223 A1 | 9/2003 | Pledereder et al. |
| 2003/0177172 A1 | 9/2003 | Duursma et al. |
| 2003/0182375 A1 | 9/2003 | Zhu |
| 2003/0200285 A1 | 10/2003 | Hansen et al. |
| 2003/0200329 A1 | 10/2003 | Delaney |
| 2003/0229529 A1 | 12/2003 | Mui et al. |
| 2003/0229785 A1 | 12/2003 | Daseke et al. |
| 2004/0027376 A1 | 2/2004 | Calder et al. |
| 2004/0098515 A1 | 5/2004 | Rezvani et al. |
| 2004/0128370 A1 | 7/2004 | Kortright |
| 2004/0133692 A1 | 7/2004 | Blanchet et al. |
| 2004/0138786 A1 | 7/2004 | Blackett et al. |
| 2004/0139309 A1 | 7/2004 | Gentil et al. |
| 2004/0152450 A1 | 8/2004 | Brasher et al. |
| 2004/0158630 A1 | 8/2004 | Chang et al. |
| 2004/0158631 A1 | 8/2004 | Chang et al. |
| 2004/0177124 A1 | 9/2004 | Hansen |
| 2004/0186693 A1 | 9/2004 | Xiang et al. |
| 2004/0215605 A1 | 10/2004 | Mester |
| 2004/0221026 A1 | 11/2004 | Dorland |
| 2004/0252628 A1 | 12/2004 | Detzler |
| 2004/0260801 A1 | 12/2004 | Li |
| 2005/0005152 A1 | 1/2005 | Singh et al. |
| 2005/0015501 A1 | 1/2005 | Kaplan et al. |
| 2005/0021772 A1 | 1/2005 | Shedrinski |
| 2005/0033588 A1 | 2/2005 | Ruiz et al. |
| 2005/0055397 A1 | 3/2005 | Zhu et al. |
| 2005/0080897 A1 | 4/2005 | Braun et al. |
| 2005/0086172 A1 | 4/2005 | Stefik |
| 2005/0102388 A1 | 5/2005 | Tabbara et al. |
| 2005/0141507 A1 | 6/2005 | Curtis |
| 2005/0144612 A1 | 6/2005 | Wang et al. |
| 2005/0154787 A1 | 7/2005 | Cochran et al. |
| 2005/0190769 A1 | 9/2005 | Smith |
| 2005/0193099 A1 | 9/2005 | Reus et al. |
| 2005/0193386 A1 | 9/2005 | McCaleb et al. |
| 2005/0196023 A1 | 9/2005 | Chen et al. |
| 2005/0198189 A1 | 9/2005 | Robinson et al. |
| 2005/0198245 A1 | 9/2005 | Burgess et al. |
| 2005/0198292 A1 | 9/2005 | Duursma et al. |
| 2005/0198379 A1 | 9/2005 | Panasyuk et al. |
| 2005/0198380 A1 | 9/2005 | Panasyuk et al. |
| 2005/0198393 A1 | 9/2005 | Stutz et al. |
| 2005/0232168 A1 | 10/2005 | Schauser et al. |
| 2005/0235014 A1 | 10/2005 | Schauser et al. |
| 2005/0246445 A1 | 11/2005 | Panasyuk et al. |
| 2005/0246702 A1 | 11/2005 | Yeh et al. |
| 2005/0251551 A1 | 11/2005 | Mitchell et al. |
| 2005/0256614 A1 | 11/2005 | Habermas |
| 2005/0256923 A1 | 11/2005 | Adachi |
| 2005/0262076 A1 | 11/2005 | Voskuil |
| 2005/0267974 A1 | 12/2005 | Panasyuk et al. |
| 2005/0273513 A1 | 12/2005 | Panasyuk et al. |
| 2006/0002315 A1 | 1/2006 | Theurer et al. |
| 2006/0015740 A1 | 1/2006 | Kramer |

(56) References Cited

U.S. PATENT DOCUMENTS

| | | |
|---|---|---|
| 2006/0029062 A1 | 2/2006 | Rao et al. |
| 2006/0029063 A1 | 2/2006 | Rao et al. |
| 2006/0029064 A1 | 2/2006 | Rao et al. |
| 2006/0031237 A1 | 2/2006 | DeAnna et al. |
| 2006/0031476 A1 | 2/2006 | Mathes et al. |
| 2006/0031779 A1 | 2/2006 | Theurer et al. |
| 2006/0037022 A1 | 2/2006 | Byrd et al. |
| 2006/0037071 A1 | 2/2006 | Rao et al. |
| 2006/0037072 A1 | 2/2006 | Rao et al. |
| 2006/0039354 A1 | 2/2006 | Rao et al. |
| 2006/0039355 A1 | 2/2006 | Rao et al. |
| 2006/0039356 A1 | 2/2006 | Rao et al. |
| 2006/0039404 A1 | 2/2006 | Rao et al. |
| 2006/0047956 A1 | 3/2006 | Calvin |
| 2006/0059239 A1 | 3/2006 | Brasher et al. |
| 2006/0066448 A1 | 3/2006 | Berisford et al. |
| 2006/0069662 A1 | 3/2006 | Laborczfalvi |
| 2006/0069668 A1 | 3/2006 | Braddy et al. |
| 2006/0069750 A1 | 3/2006 | Momtchilov et al. |
| 2006/0069753 A1 | 3/2006 | Hu et al. |
| 2006/0070029 A1 | 3/2006 | Laborczfalvi et al. |
| 2006/0070090 A1 | 3/2006 | Gulkis |
| 2006/0070131 A1 | 3/2006 | Braddy et al. |
| 2006/0074837 A1 | 4/2006 | Braddy et al. |
| 2006/0075080 A1 | 4/2006 | Burr et al. |
| 2006/0075114 A1 | 4/2006 | Panasyuk et al. |
| 2006/0075123 A1 | 4/2006 | Burr et al. |
| 2006/0075381 A1 | 4/2006 | Laborczfalvi et al. |
| 2006/0075463 A1 | 4/2006 | Braddy et al. |
| 2006/0077941 A1 | 4/2006 | Alagappan et al. |
| 2006/0087408 A1 | 4/2006 | Korzeniowski |
| 2006/0087409 A1 | 4/2006 | Korzeniowski |
| 2006/0090171 A1 | 4/2006 | Laborczfalvi et al. |
| 2006/0095334 A1 | 5/2006 | Simmons |
| 2006/0095370 A1 | 5/2006 | Seth et al. |
| 2006/0100972 A1 | 5/2006 | Chianese et al. |
| 2006/0135192 A1 | 6/2006 | Surendra et al. |
| 2006/0150249 A1 | 7/2006 | Gassen et al. |
| 2006/0159080 A1 | 7/2006 | Mazzaferri et al. |
| 2006/0159432 A1 | 7/2006 | Mazzaferri et al. |
| 2006/0161555 A1 | 7/2006 | Mazzaferri et al. |
| 2006/0161671 A1 | 7/2006 | Ryman et al. |
| 2006/0161783 A1 | 7/2006 | Aiken et al. |
| 2006/0161959 A1 | 7/2006 | Ryman et al. |
| 2006/0161974 A1 | 7/2006 | Innes et al. |
| 2006/0179143 A1 | 8/2006 | Walker et al. |
| 2006/0184614 A1 | 8/2006 | Baratto et al. |
| 2006/0190719 A1 | 8/2006 | Rao et al. |
| 2006/0200307 A1 | 9/2006 | Riess |
| 2006/0200494 A1 | 9/2006 | Sparks |
| 2006/0203007 A1 | 9/2006 | Bullard et al. |
| 2006/0206820 A1 | 9/2006 | Bullard et al. |
| 2006/0224742 A1 | 10/2006 | Shahbazi |
| 2006/0236325 A1 | 10/2006 | Rao et al. |
| 2006/0236385 A1 | 10/2006 | Innes et al. |
| 2006/0242415 A1 | 10/2006 | Gaylor |
| 2006/0247502 A1 | 11/2006 | Chen |
| 2006/0248144 A1 | 11/2006 | Zhu |
| 2006/0271875 A1 | 11/2006 | Green et al. |
| 2006/0271877 A1 | 11/2006 | Theurer et al. |
| 2006/0282521 A1 | 12/2006 | Anderson et al. |
| 2007/0005736 A1 | 1/2007 | Hansen et al. |
| 2007/0011295 A1 | 1/2007 | Hansen |
| 2007/0011356 A1 | 1/2007 | Schauser et al. |
| 2007/0022159 A1 | 1/2007 | Zhu |
| 2007/0056009 A1 | 3/2007 | Spilo et al. |
| 2007/0078976 A1 | 4/2007 | Taylor et al. |
| 2007/0088826 A1 | 4/2007 | Raphel et al. |
| 2007/0094076 A1 | 4/2007 | Perkowski et al. |
| 2007/0094672 A1 | 4/2007 | Hayton et al. |
| 2007/0100892 A1 | 5/2007 | Kephart et al. |
| 2007/0106810 A1 | 5/2007 | Ryman |
| 2007/0106811 A1 | 5/2007 | Ryman |
| 2007/0113069 A1 | 5/2007 | Gentil et al. |
| 2007/0130167 A1 | 6/2007 | Day et al. |
| 2007/0130337 A1 | 6/2007 | Arnison |
| 2007/0143837 A1 | 6/2007 | Azeez et al. |
| 2007/0150903 A1 | 6/2007 | Hansen |
| 2007/0156810 A1 | 7/2007 | Kumar |
| 2007/0156923 A1 | 7/2007 | Kumar |
| 2007/0157101 A1 | 7/2007 | Indiran et al. |
| 2007/0171921 A1 | 7/2007 | Wookey et al. |
| 2007/0174410 A1 | 7/2007 | Croft et al. |
| 2007/0174429 A1 | 7/2007 | Mazzaferri et al. |
| 2007/0174454 A1 | 7/2007 | Mitchell et al. |
| 2007/0179955 A1 | 8/2007 | Croft et al. |
| 2007/0180447 A1 | 8/2007 | Mazzaferri et al. |
| 2007/0180448 A1 | 8/2007 | Low et al. |
| 2007/0180449 A1 | 8/2007 | Croft et al. |
| 2007/0180450 A1 | 8/2007 | Croft et al. |
| 2007/0180493 A1 | 8/2007 | Croft et al. |
| 2007/0186212 A1 | 8/2007 | Mazzaferri et al. |
| 2007/0192329 A1 | 8/2007 | Croft et al. |
| 2007/0198656 A1 | 8/2007 | Mazzaferri et al. |
| 2007/0198661 A1 | 8/2007 | Hansen |
| 2007/0203952 A1 | 8/2007 | Baron et al. |
| 2007/0239886 A1 | 10/2007 | Montemayor et al. |
| 2007/0271599 A1 | 11/2007 | Rosenstein |
| 2007/0282623 A1 | 12/2007 | Dattorro |
| 2007/0288629 A2 | 12/2007 | Taylor et al. |
| 2007/0294237 A1 | 12/2007 | John et al. |
| 2008/0005321 A1 | 1/2008 | Ma et al. |
| 2008/0031235 A1 | 2/2008 | Harris et al. |
| 2008/0034057 A1 | 2/2008 | Kumar et al. |
| 2008/0034072 A1 | 2/2008 | He et al. |
| 2008/0034110 A1 | 2/2008 | Suganthi et al. |
| 2008/0034111 A1 | 2/2008 | Kamath et al. |
| 2008/0034119 A1 | 2/2008 | Verzunov et al. |
| 2008/0034410 A1 | 2/2008 | Udupa et al. |
| 2008/0034413 A1 | 2/2008 | He et al. |
| 2008/0034418 A1 | 2/2008 | Venkatraman et al. |
| 2008/0034419 A1 | 2/2008 | Mullick et al. |
| 2008/0043617 A1 | 2/2008 | Schekochikhin et al. |
| 2008/0043622 A1 | 2/2008 | Kamath et al. |
| 2008/0043749 A1 | 2/2008 | Suganthi et al. |
| 2008/0043760 A1 | 2/2008 | Venkatraman et al. |
| 2008/0043761 A1 | 2/2008 | Kumar et al. |
| 2008/0046371 A1 | 2/2008 | He et al. |
| 2008/0046616 A1 | 2/2008 | Verzunov et al. |
| 2008/0046714 A1 | 2/2008 | Suganthi et al. |
| 2008/0046717 A1 | 2/2008 | Kanekar et al. |
| 2008/0046727 A1 | 2/2008 | Kanekar et al. |
| 2008/0046994 A1 | 2/2008 | Venkatraman et al. |
| 2008/0049616 A1 | 2/2008 | Kamath et al. |
| 2008/0065757 A1 | 3/2008 | Motoyama et al. |
| 2008/0068289 A1 | 3/2008 | Piasecki |
| 2008/0068290 A1 | 3/2008 | Muklashy et al. |
| 2008/0069005 A1 | 3/2008 | von Eicken et al. |
| 2008/0069104 A1 | 3/2008 | von Eicken et al. |
| 2008/0071905 A1 | 3/2008 | Sullivan et al. |
| 2008/0082657 A1 | 4/2008 | Hart et al. |
| 2008/0109912 A1 | 5/2008 | Rivera |
| 2008/0126978 A1 | 5/2008 | Bai et al. |
| 2008/0154957 A1 | 6/2008 | Taylor et al. |
| 2008/0201405 A1 | 8/2008 | Duursma et al. |
| 2008/0208605 A1 | 8/2008 | Sinha et al. |
| 2008/0219122 A1 | 9/2008 | Detzler et al. |
| 2008/0231414 A1 | 9/2008 | Canosa |
| 2008/0250110 A1 | 10/2008 | Zhao |
| 2009/0013064 A1 | 1/2009 | Taylor et al. |
| 2009/0019226 A1 | 1/2009 | Edwards et al. |
| 2009/0055745 A1 | 2/2009 | Christiansen |
| 2009/0064134 A1 | 3/2009 | Cox |
| 2009/0099836 A1 | 4/2009 | Jacobsen et al. |
| 2009/0100349 A1 | 4/2009 | Hancock et al. |
| 2009/0106347 A1 | 4/2009 | Harwood et al. |
| 2009/0117890 A1 | 5/2009 | Jacobsen et al. |
| 2009/0119408 A1 | 5/2009 | Teze et al. |
| 2009/0187654 A1 | 7/2009 | Raja et al. |
| 2009/0234972 A1 | 9/2009 | Raghu et al. |
| 2009/0259728 A1 | 10/2009 | Berisford et al. |
| 2012/0143970 A1 | 6/2012 | Hansen |
| 2012/0158914 A1 | 6/2012 | Hansen |
| 2013/0067031 A1 | 3/2013 | Shedrinsky |

(56) References Cited

U.S. PATENT DOCUMENTS

FOREIGN PATENT DOCUMENTS

| EP | 2002/025501 | 3/2002 |
|---|---|---|
| EP | 1319212 | 6/2003 |
| EP | 1 362 282 | 11/2003 |
| EP | 1 695 485 | 8/2006 |
| EP | 1305712 | 9/2006 |
| EP | 1504371 | 2/2008 |
| FR | 2797728 | 2/2001 |
| GB | 2305820 | 4/1997 |
| JP | 60-263162 | 12/1985 |
| JP | 60-263163 | 12/1985 |
| JP | 06-062130 | 3/1994 |
| JP | 07-325513 | 12/1995 |
| JP | 09-163008 | 6/1997 |
| JP | 09-305407 | 11/1997 |
| JP | 09-325925 | 12/1997 |
| JP | 10-190922 | 7/1998 |
| JP | 10-224372 | 8/1998 |
| JP | 11-045195 | 2/1999 |
| JP | 64-061842 | 4/1999 |
| JP | 11-167540 | 6/1999 |
| JP | 11-203079 | 7/1999 |
| JP | 11-234271 | 8/1999 |
| JP | 11-238043 | 8/1999 |
| JP | 11-296453 | 10/1999 |
| JP | 2000-112863 | 4/2000 |
| JP | 2000-122952 | 4/2000 |
| JP | 2000-163283 | 6/2000 |
| JP | 2000-194583 | 7/2000 |
| JP | 2000-278773 | 10/2000 |
| JP | 2000-309145 | 11/2000 |
| JP | 2001-154953 | 6/2001 |
| JP | 2001-337817 | 12/2001 |
| JP | 2001-344129 | 12/2001 |
| JP | 2003-140991 | 5/2003 |
| JP | 2003-223603 | 8/2003 |
| JP | 2006-277752 | 10/2006 |
| JP | 4808911 | 8/2011 |
| JP | 2013-058231 | 3/2013 |
| JP | 5492968 | 3/2014 |
| WO | WO97/30879 | 8/1997 |
| WO | WO98/20439 | 5/1998 |
| WO | WO98/33302 | 7/1998 |
| WO | WO98/38910 | 9/1998 |
| WO | WO98/41943 | 9/1998 |
| WO | WO99/21336 | 4/1999 |
| WO | WO99/57649 | 11/1999 |
| WO | WO99/57837 | 11/1999 |
| WO | WO99/57838 | 11/1999 |
| WO | WO99/64958 | 12/1999 |
| WO | WO00/07099 | 2/2000 |
| WO | WO00/23894 | 4/2000 |
| WO | WO02/10919 | 2/2002 |
| WO | WO02/21239 | 3/2002 |
| WO | WO02/21299 | 3/2002 |
| WO | WO02/21414 | 3/2002 |
| WO | WO02/21415 | 3/2002 |
| WO | WO02/21777 | 3/2002 |
| WO | WO02/25501 | 3/2002 |
| WO | WO03/021464 | 3/2003 |
| WO | WO03/054439 | 7/2003 |
| WO | WO2004/059447 | 7/2004 |
| WO | WO2006/009402 | 1/2006 |
| WO | WO2008/083177 | 7/2008 |

OTHER PUBLICATIONS

Action and Response History in U.S. Appl. No. 11/774,474.
"Frequently Asked Questions about the Extensible Markup Language—The XML FAQ" Version 1.41 (http://www.oasis-open.org/cover/xmlFAQ141-19981006.html) (Oct. 6, 1998).
24x7, HealthTech Publishing Company, Inc. (Nov. 1996).
"Remote Diagnostics: Strategic weapon in the war for multi-vendor service contracts," Tech Assessment, vol. 3, No. 12, Dec. 1995.
"Siemens Medical, BJC Health System Extend deal to multivendor service," Medical Imaging News, vol. 6, No. 26, Jun. 27, 1997.
Dec. 27, 1995, SCAN Diagnostic Imaging, vol. 8, No. 24.
Apr. 22, 2005 Literature Search by Keyword: CyberTAC.
Adelberg, D., "Building Robust Wrappers for Text Sources", [online] Retrieved from the Internet<URL:http://student.bu.ac.bd/~mumit/Research/NLP-bib/papers/Adelberg99.pdf> [retrieved on Nov. 24, 2008] (1999).
Allegro Software product release 1-61 overview Greenhills Software Inc., [online] Jun. 10, 2002, pp. I-I, XPOO2201939 Retrieved from the Internet: <URL: http://www.ghs.com/partners/allegro/> [retrieved on Jun. 10, 2002] the whole document.
Allegro, RomWebCLient Embedded HTTP client Toolkit: Allegrosoft, Circuit Cellar Online, Sep. 7, 2000, pp. 1-2, XP-002201983, URL:http://web.archive.orgweb/20000709204234/http://www.allegrosoft.com/romwebclient.html.
Bock, G., "Mainstreaming XML-based Enterprise Applications: Using Oracle XML DB to Manage Financial Information within a Global Banking System", Oracle Corporation, (C) 2003.
Box, et al., Simple Object Acces Protocol (SOAP) 1.1, Document No. XP002250270, May 8, 2000.
Chandler, T. et al., "The Technology Development of Automatic Metering and Monitoring Systems", Int'l Power Engineering Conf. 2005, IEEE, 4 pgs.
Cheung, D. et al., "Distributed and Scalable XML Document Processing Architecture for E-Commerce Systems", Adv. Issues of E-Commerce and Web-Based Information Systems, WECWIS 2000, 2nd Int'l Workshop, (Jun. 2000), pp. 152-157.
Ennis, D., "CORBA and XML Integration in Enterprise Systems", IONA Technologies Inc.[online], Retrieved from the Internet:<URL:http://citeseer.ist.psu.edu/cache/papers/cs/16013/http:zSzzSzwww.iona.comzSzinfozSztechcenterzSzecoop2000apr17.pdf/ennis00corba.pdf> [retrieved on Nov. 24, 2008] (2000).
Citrix Online, Citrix Systems, Inc. Whilte Paper, "GoToMyPC Security", [online] Retrieved from the Internet<URL:http://www.citrix.it/REPOSITORY/docRepository/id_979_1124821417888736.pdf> [retrieved on Mar. 16, 2010] (2004).
Citrix Online, Citrix Systems, Inc. Whilte Paper, "GoToMyPC Corporate Technology", [online] Retrieved from the Internet<URL:http://www.gotomypc.com/downloads/pdf/m/GoToMyPC_Corporate_Technology_White_Paper.pdf> [retrieved on Mar. 16, 2010] (2004).
CyberTAC & RadScape Presentation (May 1997).
CyberTAC Design Presentation (1997).
CyberTAC from Virtual Impact Systems, Inc. Presentation (1997).
CyberTAC Remote Support System Presentation (1997).
Database WIP, Section El, Week 200156, Abstract, Document No. XP002253876 (Korea Electronics & Telecom Res Inst.) Derwent Publications, Ltd., London, GB, (Mar. 2001).
Eastvold, Roger, "Tiss and Tell," Medical Imaging, Sep. 1995.
EBITS:Electronic Business & Information Technology for Society Research Consortium, Proposal for Development of an Educational and Research Infrastructure for Safe Electronic Commerce, [online] Retrieved from the Internet<URL:http://www.cs.dartmouth.edu/~makedon/cs188/proposal.html>, [retrieved Feb. 15, 2005].
Jiang, et al., "Record-Boundary Discovery in Web Documents", [online] Retrieved from the Internet<URL:http://osm7.cs.byu.edu/deg/papers/SJ.Thesis.ps>, [retrieved on Nov. 24, 2008] (1998).
Emmerich et al., Implementing Incremental Code Migration with XML, IEEE, 4-11, (Jun. 2000).
EmWare Press Release: "emWare Announces Support for Sun Microsystems Jini Technology," Salt Lake City, UT (Feb. 1999).
EmWare Press Release: "emWare Delivers EMIT 3.0 SDK Pro-A Complete Device Networking Kit for Developing End-to-end, Embedded Device Networking Solutions," Salt Lake City, UT (May 1999).
EmWare Press Release: "emWare, IBM Demonstrate Next Phase in Establishing Worldwide Access to Embedded Devices," Chicago, IL (Mar. 1999).
EmWare Press Release: "emWare's emLink (TM) Used to Internet-enable Welch Allyn's Vital Signs Monitor," Chicago, IL (Mar. 1999).

(56) References Cited

OTHER PUBLICATIONS

EmWare Press Release: "Invensys Selects emWare EMIT Device-Networking Software to Add Remote Monitoring and Control Capabilities to its Controller Products," Salt Lake City, UT (Jun. 1999).
EmWare Press Release: "Motorola, Mitsubishi and National Semiconductor Join emWare's Embed the Internet Alliance," Chicago, IL (Mar. 1999).
ExpertCity, Inc., Whilte Paper, "GoToMyPC: Making Life Simpler for Teleworkers and Travelers", [online] Retrieved from the Internet<URL:http://www.si.umich.edu/Classes/540/Placement/GoOvrvew.pdf> [retrieved on Mar. 16, 2010] (2001).
Franklin, M. et al., "Data in Your Face: PUSH Technology in Perspective", Proc. ACM SIGMOD Intl Conf. on Mgmt of Data, (Jun. 1998), #XP000886180, pp. 516-519.
Hanckmann, J., "Telescript: The Emerging Standard for Intelligent Messaging," Philips Telecommunications Review, vol. 52(1), pp. 15-19 (Mar. 1994).
Universal Plug & Play Device Architecture, (C) Microsoft Corporation (Jun. 8, 2000), [online] Retrieved from the Internet: <URL:http://www.upnp.org/specs/arch/upnpda10_20000613.htm>, [retrieved on Nov. 24, 2008].
Incremona, A. "Remote Service Diagnostics for Imaging Equipment: Today and Tomorrow," Advanced Imaging, 12(9):90(2) (1997).
Jennyc, Kenn S., "Linking Enterprise Business Systems to the Factory Floor," The Hewlett-Packard Journal, Article 9 (May 1998).
Kafeza, E. et al., "Alerts in Mobile Healthcare Applications: Requirements and Pilot Study", IEEE, vol. 8, No. 2, pp. 173-181 (Jun. 2004).
Kimball, R., "XML Will Make it Easier," Intelligent Enterprise, [online] Retrieved from the Internet<URL:http://www.intelligententerprise.com/010416/webhouse1_1.jhtml> [retrieved on Nov. 24, 2008] (Apr. 16, 2001).
Koppen, E., et al., "Active Hypertext for Distributed Web Applications", Enabling Technologies: Infrastructure for Collaborative Enterprises, (WET ICE '99), Proc. IEEE 8th Int'l Workshop (1999), pp. 297-302.
Kovar, J., "Xerox Unveils Expanded Channel Lineup; Also Plans to Introduce E-Mail, Queue Management Software," PC Expo,(Jun. 1999).
Lassman, M. et al., "Modern Nuclear Medical Diagnostics with Efficient Gamma Cameras," Electromedica, 66(2):43-51, (1998).
Lewandowska, J., et al., "System for Grouping Technologically Similar Devices", v. 48 n. 12; (Dec. 1975), pp. 636-638 (English Abstract).
Layman, et al., "XML-Data," Position Paper from Microsoft Corp. (Jun. 1997), [online] Retrieved from the Internet<URL:http://www.oasis-open.org/cover/xml-data9706223.html> [retrieved on Sep. 2, 2004].
Lerner, R., "At the Forge: Introducing SOAP", Linux Journal, #XP002292162 (Mar. 2001).
Lindley, D., "Xerox unveils copier that phones for help," Rochester Democrat and Chronicle, (Mar. 28, 1990).
Luh, James C., "With several specs complete, XML enters widespread development," Internet World, (Jan. 4, 1999).
Martin, D., "Protessional XML"., WROX Press Ltd., pub., Ch. 11, 'Server to Server', pp. 559-562, 819-820 (2000).
Mason, K., "XML Translation for block structured languages", IBM Corporation: Research Disclosure, Kenneth Mason Publications, 44176 (2001).
Math Markup Language (Chapter 4); [online] Retrieved from the Internet<URL:http://www.w3.org/TR/REC-MathML/chap4_4.html>, [retrieved on Feb. 15, 2005].
McBride, R.A., "Security Considerations for Active Messages," ACM SIGICE Bulletin, vol. 22 (2), (Oct. 1996).
Memphis Educational Computer Connectivity Alliance (MECCA), [online] Retrieved from the Internet<URL:http://www.mecca.org/~ltague/nsfnocostextension.html>, [retrieved on Feb. 15, 2005].
Mills et al., "A knowledge-based method for inferring semantic concepts from visual models of system behavior," ACM (Jul. 2000), pp. 306-337.
Orasis Medical Services, Inc., Business Plan Copy No. 001, (Nov. 1995).
Pfeiffer, R., "XML Tutorials for Programmers: Tutorial 2: Writing XML Documents," (1999) [online] Retrieved from the Internet<URL:http://imb.com/xml>, [retrieved on Mar. 2, 1999].
Questra Applications Data Sheet (2002).
Questra Preliminary Invalidity Contentions, dated Apr. 29, 2005.
Reagan, K., "Technology for the Soul," OC Metro, (Sep. 1, 1995).
Rytting, T., "Dispensing the Goods, Embedded Style," Circuit Cellar Online, (Oct. 1999).
Schmidt, The Evolution of Workflow Standards, IEEE (1999).
SOAP Archives Online, "Multiple Method Calls in SOAP Packet"; [online] Retrieved from the Internet<URL:http://discuss.develop.com/archives/wa.exe?A2=ind9912&L=soap&T=O&F=&S=&P=25113>, [retrieved on Dec. 8, 2000].
Steinfeld, E., "From Standalone to Internet Appliance", Circuit Cellar Online, [online] (Jul. 9, 2000), #XP002201938, Retrieved from the Internet: <URL:http://web.archive.org/web/20000709204234/http://www.alegrosoft.com/romwebclient.html>retrieved on Jun. 12, 2002 the whole document.
Steinfeld, E., "Internet-appliance technology automates test equipment" EDN Magazine, pp. 157-169, Oct. 2000, www.edbmag.com.
Suresh et al., "XML-based Data System for Earth Science Applications", IEEE 2000 International, vol. 3, pp. 242-28, Jul. 2000.
Searls, "The Next Bang: The Explosive Combination of Embedded Linux, XML, and Instant Mess.", ACM (Sep. 2000) Issue 77 [online] Retrieved from the Internet<URL:http://www.linuxjournal.com/article.php?sid=4195>, [retrieved on Nov. 20, 2001].
The Simple Times, vol. 7, No. 1, Mar. 1999; [online] Retrieved from the Internet<URL:http://www.simple-times.org/pub/simple-times/issues/7-1.html> [retrieved on Aug. 3, 2005].
Trewitt, G., "Using Tcl to Process HTML Forms," Digital Network Systems Laboratory, NSL Technical Note TN-14, Palo Alto, CA (Mar. 1994).
Virtual Reality Transfer Protocol (VRTP); Retrieved from the Internet<URL:http://www.stl.nps.navy.mil/~brutzman/vrtp> (1998).
Walsh, Norman, "XSL The Extensible Style Language: Styling XML Documents," New Architect Daily, Jan. 1999.
Webmethods B2B Whitepaper; [online] Retrieved from the Internet<URL:http://www.cs.wisc.edu/~vganti/papers/b2b_wpB2Bintegration.html> (1999).
White Paper, Medical Imaging, East Providence, RI (Sep. 1995).
Wigget, Jeremy, "Intraview: Roger Eastvold of Orasis Inc.," 24×7, Nov. 1996.
Wikipedia, "GoToMyPC", [online] Retrieved from the Internet<URL: http://en.wikipedia.org/wiki/Gotomypc> [retrieved on Jan. 21, 2010] (2010).
Williams, T., "Java Goes to Work Controlling Networked Embedded Systems" Computer Design, Pennwell Publ. Littleton, MA, 35:9:36-37, Aug. 1996.
Winer, Dave, "XML-RPC Specification," (http://XML-RPC.com), Jun. 15, 1999.
Winter 1992, Field of View, vol. 2, No. 3, Toshiba America Medical System, Inc.
Wu et al., "A knowledge sharing and collaboration system model based on Internet", Systems, Man, and Cybernetics, 1999. IEEE SMC'99 Conference Proceedings, vol. 2, pp. 148-152 (1999).
Xerox 190 Copier, Electronic Data Interface Operator Guide, ver. 1.0, (1989).
Van der Werff, M., et al., "A Mobile-Based Home Automatic System", IEEE Mobility Conference (2005).
Defense Information Systems Agency, Field Services Office, White Paper Report "pcAnywhere 10.5" (Sep. 2003).
Examination Report in EP Application No. 01955993.9, dated Jan. 29, 2004.
Examination Report in EP Application No. 01955993.9, dated Aug. 5, 2004.
Examination Report in EP Application No. 01955993.9, dated Dec. 16, 2004.
Examination Report in EP Application No. 01973431.8, dated Mar. 8, 2005.

(56) References Cited

OTHER PUBLICATIONS

Communication in EP Application No. 01973431.8, dated Mar. 30, 2005.
Examination Report in EP Application No. 01973431.8, dated Jan. 15, 2008.
Office Action in EP Application No. 01996048.3, dated Jun. 22, 2004.
Office Action in EP Application No. 01996048.3, dated Mar. 11, 2005.
Office Action in EP Application No. 01955993.9, dated Jun. 6, 2005.
Examination Report in EP Application No. 03719774.6, dated Sep. 12, 2005.
Examination Report in EP Application No. 03719774.6, dated Apr. 12, 2006.
Examination Report in EP Application No. 01973431.8, dated Feb. 6, 2009.
Search Report in EP Application No. 02792391.1, dated Nov. 19, 2009.
Examination Report in EP Application No. 01973431.8, dated Mar. 23, 2010.
Examination Report in EP Application No. 02792391.1, dated Mar. 10, 2010.
Response to Examination Report in EP Application No. 01973431.8, dated Oct. 4, 2010.
Letter from Foreign Associate regarding response filed in EP Application No. 01973431.8, dated Oct. 8, 2010.
English translation of Notification of Reasons for Refusal in Japanese Application No. 2002-529431, dated Nov. 8, 2010.
Notice of Reasons for Rejection in Japanese Application No. 2002-529431, dated Nov. 8, 2010.
Machine Translation of Japanese Patent Publication No. 09-305407 (Pub Date Nov. 1997).
Machine Translation of Japanese Patent Publication No. 11-296453, (Pub Date Oct. 1999).
Machine Translation of Japanese Patent Publication No. 11-203079, (Pub Date Jul. 1999).
Machine Translation of Japanese Patent Publication No. 2000-309145, (Pub Date Nov. 2000).
Machine Translation of Japanese Patent Publication No. 2001-337817, (Pub Date Dec. 2001).
Machine Translation of Japanese Patent Publication No. 11-045195, (Pub Date Feb. 1999).
Machine Translation of Japanese Patent Publication No. 2000-163283, (Pub Date Jun. 2000).
International Search Report in Application No. PCT/US2002/040058, dated Nov. 3, 2003.
International Preliminary Examination Report in Application No. PCT/US2002/040058, dated Jun. 10, 2004.
International Search Report in Application No. PCT/US01/23651, dated Jun. 3, 2002.
International Search Report in Application No. PCT/US01/29787, dated Jun. 28, 2002.
International Preliminary Examination Report in Application No. PCT/US01/29787, dated Aug. 21, 2002.
International Preliminary Examination Report in Application No. PCT/US01/23651, dated Oct. 10, 2002.
International Search Report in Application No. PCT/US01/45198, dated Apr. 29, 2003.
International Search Report in Application No. PCT/US03/11707, dated Sep. 24, 2003.
International Search Report and Written Opinion in Application No. PCT/US03/11701, dated Oct. 13, 2004.
Written Opinion in Application No. PCT/US01/45198, dated May 31, 2007.
International Preliminary Examination Report in Application No. PCT/US01/45198, dated Apr. 2, 2008.
International Preliminary Report on Patentability (incl. Written Opinion) in Application No. PCT/US2007/088858, dated Jul. 9, 2009.
International Search Report &. Written Opinion in Application No. PCT/US2007/088858, dated May 21, 2008.
Summons to attend Oral Proceedings in counterpart EP Application No. 01973431.8, dated Feb. 2, 2011.
Second Auxiliary Response in EP Application No. 01973431.8, dated Apr. 26, 2011.
Oral Proceedings Communication in Application No. EP01973431.8, dated May 12, 2011.
Decision to Refuse in Application No. EP01973431.8, dated Jun. 21, 2011.
Action in Application No. JP 2002-515578, dated Jul. 26, 2011.
Response filed in Application No. JP2002-529431, dated May 2, 2011.
Summons to attend oral proceedings in corresponding European Application No. 01955993.9 dated Oct. 31, 2005.
Result of Consultation of Nov. 24, 2005 and Nov. 25, 2005 from corresponding European Application No. 01955993.
Submission in German dated Nov. 25, 2005 from corresponding European Application No. 01955993.9.
Annex to EPO Form 2004 with claims for grant in European Application No. 01955993.9.
Oral Proceeding Minutes in European Application No. 01955993.9, dated Jan. 16, 2006.
Communication dated Apr. 26, 2005 in European Application No. 01955993.9.
Action and Response History in U.S. Appl. No. 10/784,138.
Action and Response History in U.S. Appl. No. 11/677,279.
Action and Response History in U.S. Appl. No. 11/503,638.
Action and Response History in U.S. Appl. No. 11/673,943.
Action and Response History in U.S. Appl. No. 10/124,181.
Action and Response History in U.S. Appl. No. 09/627,201.
Action and Response History in U.S. Appl. No. 10/805,012.
Action and Response History in U.S. Appl. No. 09/667,737.
Action and Response History in U.S. Appl. No. 09/716,717.
Action and Response History in U.S. Appl. No. 09/708,384.
Action and Response History in U.S. Appl. No. 10/123,960.
Action and Response History in U.S. Appl. No. 10/028,126.
Japanese Office action with English from Japanese application 2012-245293 issued Oct. 1, 2013 (7 pages).
Wikipedia, Java (software platform), http://en.wikipedia.org/wiki/java_(software_platform), Jul. 11, 2013 (12 pages).
Response to Office Action with English translation filed Dec. 26, 2013 in Japanese application No. 2012-245293 (22 pages).
Eastvold, Roger, "Services: the Next Generation," The Professional Journal, vol. 20, No. 4, 1996 (Previously submitted on Feb. 3, 2014).

\* cited by examiner

ESTABLISHING A VIRTUAL TUNNEL BETWEEN TWO COMPUTER PROGRAMS

CROSS-REFERENCE TO RELATED APPLICATION

This application is a continuation of (and claims the benefit of priority under 35 USC 120) U.S. application Ser. No. 13/105,385, filed May 11, 2011, now U.S. Pat. No. 8,291,039 which is a continuation of U.S. application Ser. No. 10/784,138, filed Feb. 20, 2004, now U.S. Pat. No. 7,966,418 which claims the benefit of Provisional Application Ser. No. 60/449,213, filed Feb. 21, 2003. The disclosures of U.S. application Ser. No. 13/105,385, U.S. application Ser. No. 10/784,138 and Provisional Application Ser. No. 60/449,213 are considered part of (and are incorporated by reference into) the disclosure of this application.

BACKGROUND

Many products, both hardware and software, have diagnostic tools or applications for communicating with them. When such products are located at customer sites, there is no way to use these tools except to send a service technician on-site to diagnose and repair any problems.

Tunneling solutions exist that provide a diagnostic program with access to a remote application. However, such tunneling solutions require a server at each site to provide access to applications behind its firewall. Since the additional server requires additional administration and maintenance at each site, it is an additional burden to end-users or customers.

Furthermore, and perhaps more significantly, installing a server at each site that provides tunnel access to a local network also has security risks. For example, such a server is addressable via the Internet, and thus is a target to break into an otherwise secure network.

SUMMARY

In general, in one aspect, the invention is directed to a method of transferring data via a communication session between a client application and a server application. The method includes assigning an identifier to the communication session, creating at least one queue associated with the communication session, and using the identifier to store data passed between the client application and the server application in the at least one queue. The client application and the server application run local protocols, and the data is passed between the client application and the server application via an intermediary protocol. The intermediary protocol may be different from the local protocols or it may be the same protocol as the local protocols. This aspect may include one or more of the following.

A socket interface may be created to at least one of the client application and the server application. The data may be transmitted through the socket interface. The client application and the server application may be on networks that run the local protocols, and the method may include converting between the local protocols and the intermediary protocol when passing the data.

The local protocol may be TCP/IP or a serial protocol, such as RS232 and RS485. The intermediary protocol may be HTTP. The method may be performed by a server, and may also include performing load balancing to select the server from among plural servers. The identifier may be associated with the at least one queue, and may be invalidated when the communication session terminates.

The communication session may be a telnet session or may be effected via a Web site. A session record may be maintained, which includes an identity of a user initiating the session along with other information.

The method may be implemented via machine-executable instructions stored on a readable medium/media. The method may be implemented via one or more processors on one or more machines executing such instructions.

In general, in another aspect, the invention is directed to a system for transferring data via a communication session between a client application and a server application, where the client application runs on a first network and the server application runs on a second network. The system includes a proxy having a socket to the client application. The proxy converts data between a local protocol run on the first network to a non-local protocol. An agent creates a socket to the server application. The agent converts data between a local protocol run on the second network and the non-local protocol. A server is in communication with the proxy and the agent. The server contains a message queue dedicated to the communication session. The message queue stores data transmitted during the communication session. This aspect may include one or more of the following features.

The proxy may poll the server for data for the client application. When data is present for the client application, the proxy may retrieve the data from the message queue and pass the data to the client application. The agent may poll the server for data for the server application. When data is present for the client application, the agent may retrieve the data from the message queue and pass the data to the server application.

Other features and advantages of the invention will become apparent from the following description, including the claims and drawings.

DESCRIPTION

The system described herein creates a virtual communication link (called a "virtual tunnel") between two computer programs (e.g., client and server applications) that are not able to address each other directly. This situation may occur when a client application needs to connect to a server application at a remote site. The server application may be on a computer on a customer or partner's non-addressable local network (e.g., behind a firewall). As such, the client application will not be able to address the server application directly.

Figure 1:
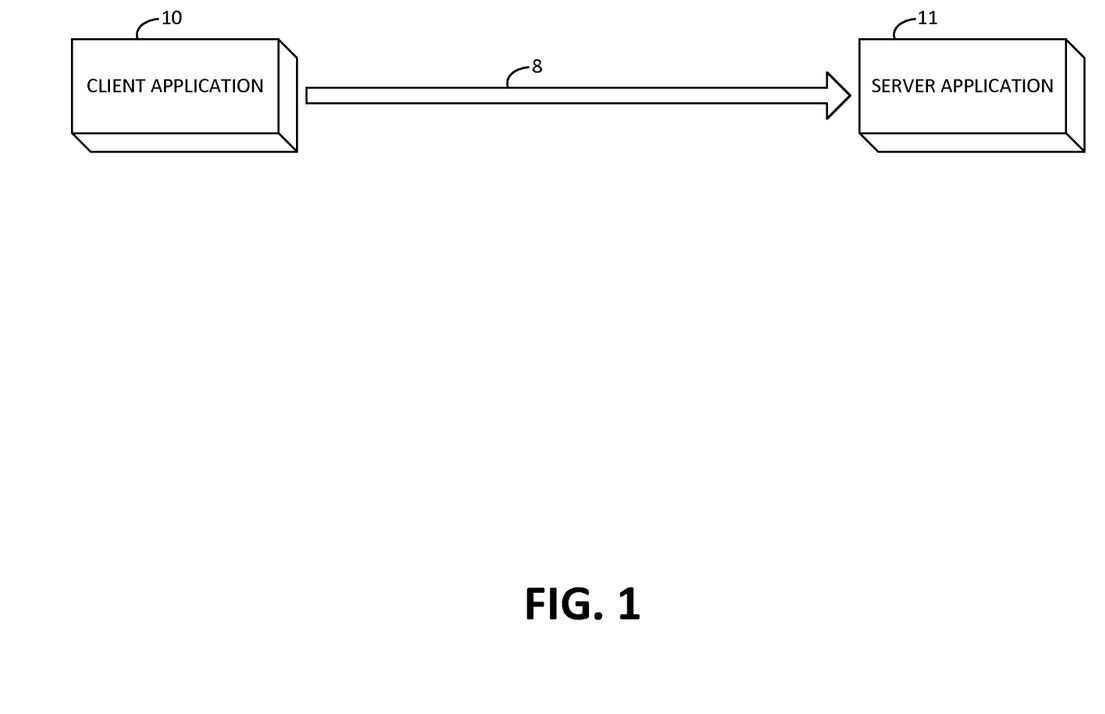
FIG. 1 is a block diagram illustrating the concept of a virtual tunnel between two computer programs.

A virtual tunnel may be used to provide the client application access to the server application. FIG. 1 illustrates the concept of a virtual tunnel 8 between client application 10 and server application 11. Virtual tunnel 8 enables client application 10 and server application 11 to communicate as if there were no firewalls between them (which, typically, there are).

Figure 2:
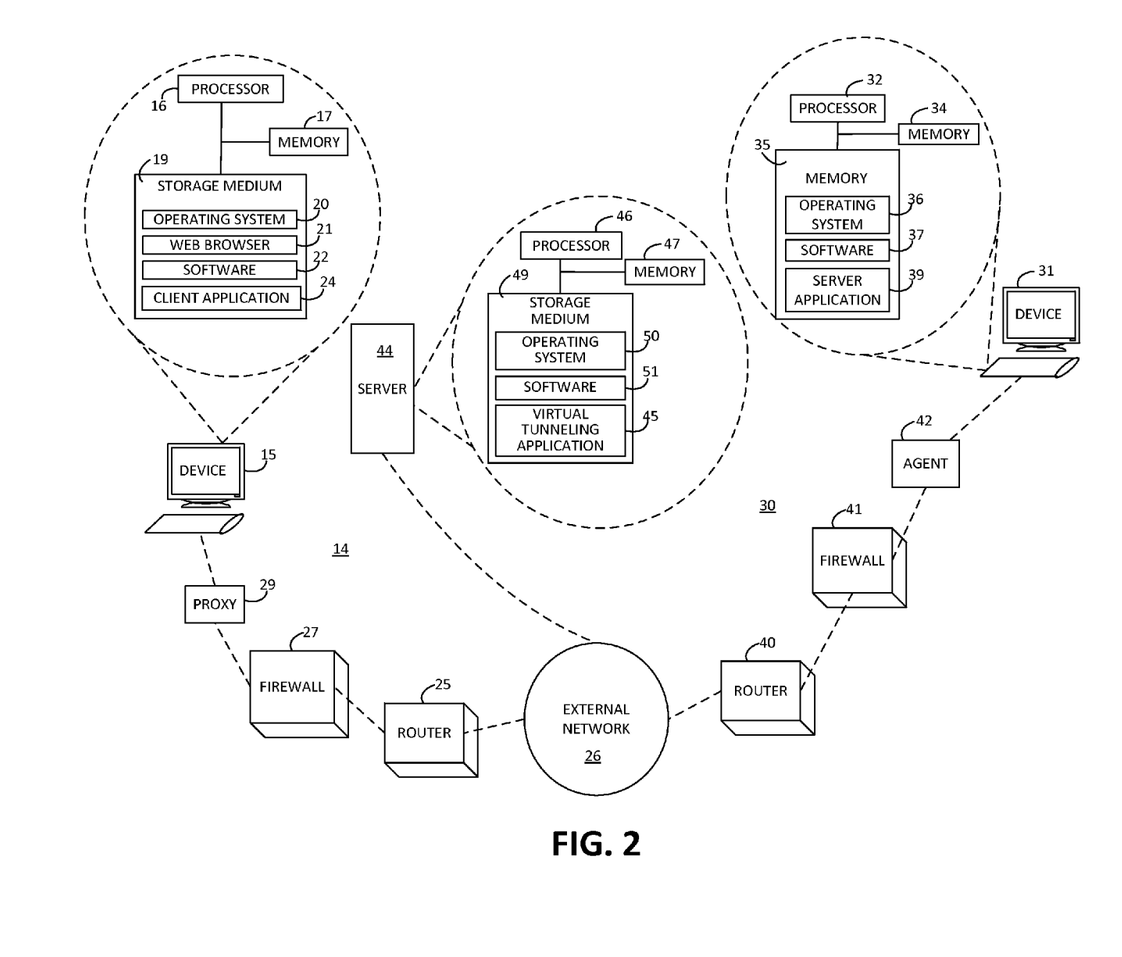
FIG. 2 is a block diagram of a network containing computer programs (client application and server application) that communicate via a virtual tunnel.

FIG. 2 shows a client local network 14. Client local network 14 includes a device 15, such as a computer, that contains a processor 16, a memory 17, and a storage medium 19 for storing, among other things, an operating system (OS) 20, a Web browser 21, software 22 for effecting network communications, and one or more executable applications (e.g., computer programs). Among these applications is client application 24. Client application 24 is a computer program for communicating with and diagnosing local or remote hardware and/or software.

A router (or modem) 25 couples client local network 14 to an external network 26, such as the Internet/World Wide Web (Web). External network 26 may run Internet Protocol (IP), HyperText Transfer Protocol (HTTP) and other suitable protocols. Network connections may be via Ethernet, telephone line, wireless, or other transmission media.

A firewall 27 is maintained between client local network 14 and external network 26. Firewall 27 may be implemented via software run on the closest "intelligent" device to external network 26, e.g., router 25 or device 15. The firewall prevents others from directly addressing devices on client local network 14 via external network 26. As a result of the firewall, only users on client local network 14 (or some defined subset thereof) are permitted to address device 15 directly.

Client local network 14 may run a local protocol, such as Transmission Control Protocol/Internet Protocol (TCP/IP), which may be the same as, or different than, the protocols that run on external network 26. Examples of other protocols that may be run on client local network 14 include, but are not limited to, serial protocols, such as RS232 and RS485, and proprietary protocols.

Client local network 14 also includes proxy 29, which is used to effect communication between client application 24 and a remote server application. Proxy 29 may be a computer program executing on device 15 or another processing device, such as a router 25, in client local network 14. In addition to the functions described below, proxy 29 performs any conversions necessary between the protocols running on external network 26 and those running on client local network 14.

FIG. 2 also shows a server local network 30. Server local network 30 is depicted as being similar to client local network 14 for the sake of illustration. In reality, however, the two local networks may be very different.

Server local network 30 includes a device 31, such as a server, that contains a processor 32, a memory 34, and a storage medium 35 for storing, among other things, an operating system (OS) 36, software 37 for effecting network communications, and one or more executable applications (e.g., computer programs). Among these applications is server application 39. Server application 39 is a computer program that may, among other things, provide information to users via external network 26 or via local network 30. Examples of such information include, but are not limited to, Web pages and diagnostics or operational control information pertaining to the device.

A router (or modem) 40 couples server local network 30 to external network 26. As above, network connections may be via Ethernet, telephone line, wireless, or other transmission media. A firewall 41 is also maintained between server local network 30 and external network 26. Firewall 41 may be implemented via software run on the closest "intelligent" device to external network 26, e.g., router 40 or device 31. The firewall prevents others from directly addressing device 31 via external network 26. As above, only users on server local network 30 (or some subset thereof) are permitted to address device 31 directly.

Server local network 30 may run a local protocol that may be the same as, or different than, protocols that run on external network 26 and/or client local network 14. Examples of such protocols include, but are not limited to, TCP/IP, serial protocols, such as RS232 and RS485, and proprietary protocols.

Server local network 30 also includes agent 42, which is used to effect communication between client application 24 and server application 39. Agent 42 may be a computer program executing on device 31 or another processing device, such as a router 40, in server local network 30. In addition to the functions described below, agent 42 performs any conversions necessary between the protocols running on external network 26 and those running on server local network 30.

Agent 42 has a local configuration of interfaces. Each interface has a name, IP (Internet Protocol) address, or other information relevant to the local protocol, such as baud rate. Local configuration of the interfaces allows a local operator to control access to applications on server local network.

Proxy 29 and agent 42 perform essentially the same functions (described below) which allow client application 24 and server application 39 to communicate via a virtual tunnel. Proxy 29 and agent 42 may be pre-programmed into devices on respective local networks 14 and 30. Alternatively, one or both of proxy 29 and agent 42 may be downloaded, e.g., from external network 26. For example, in one embodiment, proxy 29 is an applet that is downloaded from a server 44 on external network 26 and that is installed on device 15. The applet may be included in a Web page that is provided by server 44, and that is accessed by a user when establishing a virtual tunnel between client application 24 and server application 39. This process is described in more detail below.

External network 26 contains server 44, which is a computer or any other processing device. Other devices (not shown) are also located on external network 26. For example, external network 26 may contain routers, switches, and the like (not shown), which receive data packets and which forward the data packets along paths to their intended destinations. Other servers, personal computers, mainframes, and processing devices (not shown) may also be on, and/or have access to, external network 26.

Server 44 acts as an intermediary for communications between client application 24 and server application 39 in the manner described below. Server 44 runs HTTP (Hypertext Transfer Protocol) and is "visible" to other devices, such as device 15, via external network 26.

In more detail, server 44 is used in passing data between client application 24 and server application 39 because these applications cannot address each other directly. That is, since both applications are on local networks, they do not have universally-recognized network addresses. As such, the client and server applications cannot address one another without the aid of server 44.

Server 44 includes a controller, such as a microprocessor, for executing software (machine-executable instructions) stored in a memory to perform the functions described below. To avoid confusion in terminology, the following reads as though those functions are performed by server 44, even though software in server 44, namely virtual tunneling application 45, performs the functions.

In this embodiment, server 44 contains a processor 46, a memory 47, and a storage medium 49 for storing, among other things, an operating system (OS) 50, software 51 for effecting network communication, and one or more applications. Processor 46 may execute software, including the applications, out of memory 47. Among these applications is tunneling application 45.

Tunneling application 45 creates a virtual tunnel between client application 24 on client local network 14 and server application 39 on server local network 30. Tunneling application 45 includes process 54 (FIG. 3) to establish the virtual tunnel, as described below. The virtual tunnel allows client application 24 and server application 39 to communicate even though they are both behind firewalls and cannot directly address each other.

The virtual tunnel is also advantageous because it preserves the protocols running on local networks 14 and 30. That is, data is transferred through the virtual tunnel via an intermediary protocol, such as HTTP, that is run on external network 26. The protocols running on local networks 14 and 30 are essentially transmitted via the protocol of external network. When data reaches its destination, e.g., at local network 14 or 30, the local protocol is thus recovered by either proxy 29 or agent 42, thereby enabling the same protocol to be used at both the source and destination local networks. Proxy 29 and agent 42 are both capable of converting between a local protocol and the intermediary protocol. In this regard, it is noted that the intermediary protocol may be the same as, or different from, the local protocols.

Figure 3:
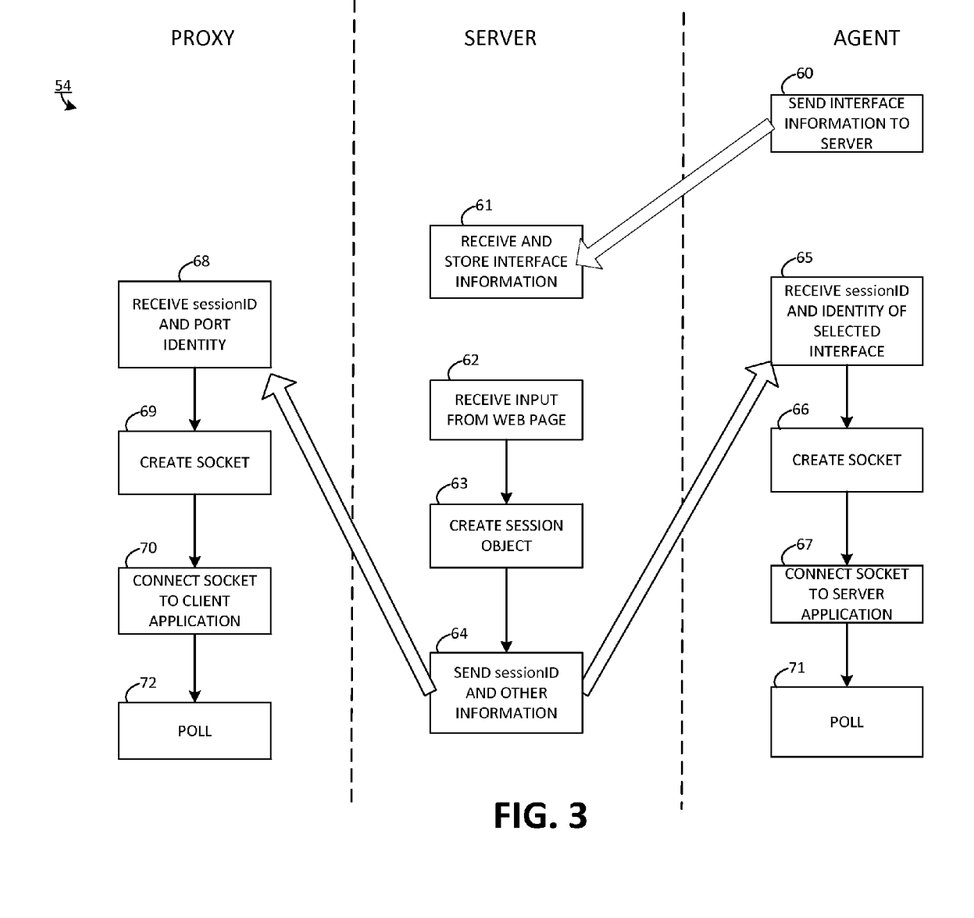
FIG. 3 is a flowchart showing a process for creating a virtual tunnel.

FIG. 3 shows process 54 that is performed by proxy 29, server 44, and agent 42 to set-up a virtual tunnel for a communication session between client application 24 and server application 39. The section of FIG. 3 labeled "Agent" corresponds to functions performed by agent 42; the section of FIG. 3 labeled "Proxy" corresponds to functions performed by proxy 29; and the section of FIG. 3 labeled "Server" corresponds to functions performed by tunneling application 45 (on server 44).

Referring to FIG. 3, agent 42 sends (60), to server 44, interface information, including, but not limited to, interface names and port numbers of agent 42 associated with server application 39. The interface information may be sent, e.g., in response to installing agent 42 on local network 30. Server 44 receives (61) the interface information and stores the interface information in a database (not shown). The database is associated with agent 42.

Information in the database may be made accessible to a user, e.g., at device 15 via a Web browser. The information may be made accessible via a Web page (not shown) provided by server 44. The Web page may contain a list of devices on local network 30 that may be accessed via virtual tunneling. The identities of the devices, which may be provided to server 44 along with the interface information, are associated with software interfaces to such devices. When a user selects a device to connect to, the user is, in effect, selecting an interface of agent 42.

A user who wants to connect to a device on local network from client application 24 logs into server 44 via a Web page (not shown). The user then selects a device (and, thus, an interface) to begin a communication session with that device. Server 44 receives (62) the input from the Web page. As noted above, the Web page may contain an applet that comprises proxy 29. In this case, when the user selects a device and enters the selection, the applet may be installed on device 15 as proxy 29.

Server 44 may control access to agents and interfaces through a predefined security (access) policy. For example, server 44 may allow some users, but not others, access to devices on local network 30. Likewise, users may be restricted as to which devices they may access. Server 44 may control access based on user IDs (identifiers) and/or passwords assigned to system users. For example, server 44 may maintain a database of user IDs and/or passwords corresponding to devices that are accessible via those user IDs and/or passwords. If a user attempts to establish a communication session with a device for which he has not been permitted access, server 44 may provide that user with an error message or the like.

Assuming that the user has access to the requested device, in process 54, server 44 creates (63) a session object for the current communication session. The session object contains message queues. The message queues are used to store data that is passed between client application 24 and server application 39.

In this embodiment, the session object contains two message queues (other embodiments may contain more, or less, message queues). One message queue is for data going from client application 24 to server application 39 and the other message queue is for data going from server application 39 to client application 24.

The session object also has an associated session identifier, referred to as a "sessionID" string. The sessionID string may be a unique alphanumeric identifier that identifies communications associated with a particular communication session. As described below, all data transfers associated with a communication session between client application 24 and server application 39 pass through server 44. The sessionID string is used by server 44 (in particular, by tunneling application 45) to store the data in the appropriate message queues(s).

In process 54, server 44 sends (64) the sessionID string and selected interface name to agent 42. Agent 42 receives (65) this message and creates (66) a socket using the port and IP address that correspond to the selected interface name. Agent 42 connects (67) the socket to server application 39. If connection fails, agent 42 reports an error to server 44. It is noted that sockets are used in this embodiment because they are a well-known way of communicating. Other means of communication may be used, including proxies, pipes, serial communications, etc.

In process 54, server 44 also sends (64) the sessionID string and port or other protocol parameters to proxy 29. Proxy 29 receives (68) this message and creates (69) a socket using the port that corresponds to client application 24. Proxy 29 then provides (70) an "accept" instruction on that socket. The accept instruction enables proxy 29 to accept data from client application 24.

Both proxy 29 and agent 42 execute a software thread to poll (71, 72) for data on their respective sockets, and also to poll for data from server 44. When data from client application 24 is received on a socket of proxy 29, proxy 29 appends the appropriate sessionID string to the data and passes the data to server 44. The sessionID string enables server 44 to identify the data as belonging to a particular communication session, and to store the data in the appropriate message queue. Agent 42 polls for data from server 44, meaning that it searches for data from server 44 that is stored in message queues for agent 42. If there is data present, agent 42 retrieves the data, identifies the communication session using the sessionID string associated with the data, and passes the data to server application 39 via the established socket.

The converse occurs for data passed from server application 39 to client application 24. More specifically, data from server application 24 is received on a socket of agent 42. Agent 42 appends the sessionID string for the current communication session to the data and passes the data to server 44. Proxy 29 polls for data from server 44. If there is data present in an appropriate message queue, proxy 29 retrieves the data, identifies the communication session using the sessionID string, and passes the data to client application 24.

On each socket, a select or "recv" (receive) instruction (command) determines if there is data to read. When data is read from a socket, the data may be sent to server 44 (by proxy 29 or agent 42) as the body of an HTTP POST command. Data in server 44 may be polled (by proxy 29 or agent 42) using an HTTP GET command. If there is data in server 44, the data is passed in a reply to the GET command. This data is then written to the appropriate socket. When an HTTP command is sent, its URL parameters include a "session=SSS" parameter, where "SSS" is the sessionID for a communication session.

As noted above, server 44 has a session object that contains two message queues. Data sent from proxy 29 is stored in one message queue and delivered when agent 42 issues a GET command. The other message queue contains data being passed from agent 42 to proxy 29.

Proxy 29 and agent 42 may encrypt communications sent to server 44. Examples of encryption that may be used include Secure Sockets Layer (SSL) and Hyper Text Transfer Protocol Secure sockets (HTTPS). The recipient (e.g., proxy 29 or agent 42) should have sufficient capabilities to perform any necessary decryption.

In this embodiment, there are two ways to end a communication session (i.e., terminate a virtual tunnel). The session may end when either client application 24 or server application 39 closes its socket. However, some applications open and close sockets during the normal course of communications. For applications such as these, the user may terminate the session manually when the applications are finished running. The user may choose a termination scenario when creating the session.

Server 44 may maintain an audit log (i.e., record) of communication sessions. The audit log may identify the user, time, duration, agent, interface, and number of bytes transferred in a communication session. The actual data may be stored as human-readable text or in another format. Audit logs are particularly advantageous in diagnostic and repair scenarios, where it is often necessary to identify device modifications and repairs after the fact.

Server 44 may be associated with multiple servers, one or more of which may act as a load balancing server to distribute communications amongst other servers. In this case, when a session object is created, the session object may be created on a server that has the most (or greater than a predetermined amount of) resources available and/or a server that is located closest to (or within a predetermined location of) agent 42. In this case, the Uniform Resource Locator (URL) of the server that is being used to effect communication is sent to agent 42 and proxy 29, along with the sessionID. In all subsequent communications, proxy 29 and agent 42 include the URL of the server. This ensures that a single server handles a single communication session.

The virtual tunnel system described herein is not limited to use with the hardware/software configuration of FIGS. 2 and 3; it may find applicability in any computing or processing environment. The functionality of the virtual tunnel system, including, but not limited to, the functions performed by proxy 29, server 44, and agent 42, may be implemented in hardware (e.g., an ASIC {Application-Specific Integrated Circuit} and/or an FPGA {Field Programmable Gate Array}), software, or a combination of hardware and software.

The virtual tunnel system may find applicability in any computing or processing environment and with any type of machine that is capable of running machine-readable instructions, such as one or more computer programs.

The virtual tunnel system can be implemented in digital electronic circuitry, or in computer hardware, firmware, software, or in combinations of them. The virtual tunnel system can be implemented as a computer program product, i.e., a computer program tangibly embodied in an information carrier, e.g., in a machine-readable medium or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps implemented to effect virtual tunneling can be performed by one or more programmable processors executing one or more computer programs to perform functions described herein by operating on input data and generating output. Method steps can also be performed by, and the virtual tunnel system can be implemented as, special purpose logic circuitry.

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer include a processor for executing instructions and one or more memory devices for storing instructions and data. Generally, a computer will also include, or be operatively coupled to receive data from, or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The virtual tunnel system can be implemented in a computing system that includes a back-end component, e.g., as a data server, or that includes a middleware component, e.g., an application server, or that includes a front-end component, e.g., a client computer having a graphical user interface or a Web browser through which a user can interact with the virtual tunneling system, or any combination of such back-end, middleware, or front-end components. The components of the system can be interconnected by any form or medium of digital data communication, e.g., a communication network. Examples of communication networks include a local area network ("LAN") and a wide area network (WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The process described above is not limited to the implementations set forth herein. For example, the process is not limited to use with the virtual tunnel system described herein, but rather may be implemented in any type of network-based communication system.

It is noted that client application 24 and server application 39 may communicate directly when a direct connection can be achieved (e.g., if they are on the same network). To effect direct communication, if client application 24 and server application 39 use TCP/IP, server application 39 creates a socket on a specific port. Client application 24 also creates a socket and connects to this port. If server application 39 runs on another computer, client application 24 also specifies the network address of that computer. At this point, the client and server are connected and begin communicating.

The local protocols run on local networks 14, 30 may be TCP/IP or a serial protocol, such as RS232 or RS485. The protocol run on external network 26 may be HTTP. The virtual tunnel may comprise a telnet session (e.g., the tunnel is implemented during the telnet session).

It is noted that more than one agent may be present on local network 30 and more than one proxy may be present on local network 14. There may be a one-to-one correspondence between devices and agents and between devices and proxies. Alternatively, a single proxy may service different devices and, likewise, a single agent may service different devices. Similarly, multiple proxies may service the same device and multiple agents may service the same device.

The sessionID string may expire after a predetermined period of time, necessitating a new communication session. For example, the sessionID may expire after a period during which no communications are exchanged. This period may be programmed into server 44. Similarly, the sessionID string expires when a communication session terminates.

Other embodiments not described herein are also within the scope of the following claims.

What is claimed is:

1. A method performed by one or more computing devices for transferring data in a communication session between a first application on a first network and a second application on a second network, the method comprising:
    storing, in a database and in association with the first application, information about a computer program for converting between a non-local protocol and a local protocol associated with the first application to thereby provide data to the first application in the local protocol, the database being stored in computer memory;
    assigning an identifier to the communication session;
    creating at least one queue associated with the communication session, the at least one queue being created in computer memory;
    storing, in the at least one queue, data received from the second application that is destined for the first application, the received data being stored in association with the identifier;
    receiving a command from the computer program;
    using the one or more computing devices to output the received data from the at least one queue to the computer program in reply to the command;
    wherein the first application and the second application run local protocols, and the received data is passed at least partly between the first application and the second application using an intermediary protocol that corresponds to the non-local protocol; and
    wherein the first application is on the first network behind a first firewall, and the second application on the second network is behind a second firewall that is different from the first firewall.

2. The method of claim 1, further comprising:
    the computer program creating a socket interface to the first application, the received data being transmitted through the socket interface.

3. The method of claim 1, wherein the local protocol comprises at least one of TCP/IP or a serial protocol, the serial protocol comprising one of RS232 or RS485.

4. The method of claim 1, wherein the intermediary protocol comprises HTTP.

5. The method of claim 1, wherein the identifier is associated with the at least one queue.

6. The method of claim 1, wherein the identifier is invalidated when the communication session terminates.

7. The method of claim 1, wherein the communication session comprises a telnet session.

8. The method of claim 1, further comprising maintaining a session record, the session record including an identity of a user initiating the communication session.

9. The method of claim 1, wherein the command is an HTTP POST command or an HTTP GET command.

10. The method of claim 1, further comprising:
    establishing the communication session along with a user-selected termination scenario for terminating the communication session.

11. The method of claim 1, wherein the computer program is a first computer program and the at least one queue comprises a first queue and a second queue that is different from the first queue; and
    wherein the method further comprises:
        storing, in the database and in association with the second application, information about a second computer program for converting between a non-local protocol and a local protocol associated with the second application to thereby provide data to the second application in the local protocol associated with the second application;
        storing, in the second queue, data received from the first application that is destined for the second application, the received data from the first application being stored in association with the identifier;
        receiving a command from the second computer program; and
        using the one or more computing devices to output the received data from the first application from the second queue to the second computer program in reply to the command from the second computer program.

12. One or more non-transitory machine-readable storage media storing instructions that are executable by one or more computing devices to perform operations to transfer data in a communication session between a first application on a first network and a second application on a second network, the operations comprising:
    storing, in a database and in association with the first application, information about a computer program for converting between a non-local protocol and a local protocol associated with the first application to thereby provide data to the first application in the local protocol;
    assigning an identifier to the communication session;
    creating, in computer memory, at least one queue associated with the communication session;
    storing, in the at least one queue, data received from the second application that is destined for the first application, the received data being stored in association with the identifier;
    receiving a command from the computer program;
    output outputting the received data from the at least one queue to the computer program in reply to the command;
    wherein the first application and the second application run local protocols, and the received data is passed at least partly between the first application and the second application using an intermediary protocol that corresponds to the non-local protocol; and
    wherein the first application is on the first network behind a first firewall, and the second application on the second network is behind a second firewall that is different from the first firewall.

13. The one or more non-transitory machine-readable media of claim 12, wherein the local protocol comprises at least one of TCP/IP or a serial protocol, the serial protocol comprising one of RS232 or RS485.

14. The one or more non-transitory machine-readable media of claim 12, wherein the intermediary protocol comprises HTTP.

15. The one or more non-transitory machine-readable media of claim 12, wherein the identifier is associated with the at least one queue.

16. The one or more non-transitory machine-readable media of claim 12, wherein the identifier is invalidated when the communication session terminates.

17. The one or more non-transitory machine-readable media of claim 12, wherein the communication session comprises a telnet session.

18. The one or more non-transitory machine-readable media of claim 12, wherein the operations comprise maintaining a session record, the session record including an identity of a user initiating the communication session.

19. The one or more non-transitory machine-readable media of claim 12, wherein the command is an HTTP POST command or an HTTP GET command.

20. The one or more non-transitory machine-readable media of claim 12, wherein the operations comprise establishing the communication session along with a user-selected termination scenario for terminating the communication session.

21. A system comprising:
computer memory storing instructions that are executable by one or more computing devices; and
one or more computing devices to execute the instructions to perform operations to transfer data in a communication session between a first application on a first network and a second application on a second network, the operations comprising:
storing, in a database and in association with the first application, information about a computer program for converting between a non-local protocol and a local protocol associated with the first application to thereby provide data to the first application in the local protocol, the database being stored in computer memory;
assigning an identifier to the communication session;
creating at least one queue associated with the communication session, the at least one queue being created in computer memory;
storing, in the at least one queue, data received from the second application that is destined for the first application, the received data being stored in association with the identifier;
receiving a command from the computer program;
outputting the received data from the at least one queue to the computer program in reply to the command;
wherein the first application and the second application run local protocols, and the received data is passed at least partly between the first application and the second application using an intermediary protocol that corresponds to the non-local protocol; and
wherein the first application is on the first network behind a first firewall, and the second application on the second network is behind a second firewall that is different from the first firewall.

22. The system of claim 21, wherein the command is an HTTP POST command or an HTTP GET command.

23. The system of claim 21, wherein the operations comprise establishing the communication session along with a user-selected termination scenario for terminating the communication session.

24. The system of claim 21, wherein the computer program is a first computer program and the at least one queue comprises a first queue and a second queue that is different from the first queue; and
wherein the operations comprise:
storing, in the database and in association with the second application, information about a second computer program for converting between a non-local protocol and a local protocol associated with the second application to thereby provide data to the second application in the local protocol associated with the second application;
storing, in the second queue, data received from the first application that is destined for the second application, the received data from the first application being stored in association with the identifier;
receiving a command from the second computer program; and
outputting the received data from the first application from the second queue to the second computer program in reply to the command from the second computer program.

25. The one or more non-transitory machine-readable media of claim 12, wherein the computer program is a first computer program and the at least one queue comprises a first queue and a second queue that is different from the first queue; and
wherein the operations comprise:
storing, in the database and in association with the second application, information about a second computer program for converting between a non-local protocol and a local protocol associated with the second application to thereby provide data to the second application in the local protocol associated with the second application;
storing, in the second queue, data received from the first application that is destined for the second application, the received data from the first application being stored in association with the identifier;
receiving a command from the second computer program; and
outputting the received data from the first application from the second queue to the second computer program in reply to the command from the second computer program.

* * * * *

UNITED STATES PATENT AND TRADEMARK OFFICE
CERTIFICATE OF CORRECTION

| | | |
|---|---|---|
| PATENT NO. | : 9,002,980 B2 | Page 1 of 1 |
| APPLICATION NO. | : 13/614311 | |
| DATED | : April 7, 2015 | |
| INVENTOR(S) | : Felix Shedrinsky | |

It is certified that error appears in the above-identified patent and that said Letters Patent is hereby corrected as shown below:

In the claims,

Column 10, Line 55, In Claim 12, before "outputting" delete "output".

Signed and Sealed this
Twelfth Day of January, 2016

Michelle K. Lee
*Director of the United States Patent and Trademark Office*